United States Patent [19]
Han

[11] Patent Number: 5,825,851
[45] Date of Patent: *Oct. 20, 1998

[54] METHOD AND APPARATUS FOR AUTOMATICALLY TRANSFERRING A CALLER TO A SELECTED EXTENSION

[75] Inventor: Cheol-Hee Han, Seoul, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 668,071

[22] Filed: Jun. 17, 1996

[30] Foreign Application Priority Data

Jun. 17, 1995 [KR] Rep. of Korea ................. 16185/1995
Nov. 27, 1995 [KR] Rep. of Korea ................. 43980/1995

[51] Int. Cl.⁶ ............................. H04M 1/64; H04M 3/42; H04M 1/00; H04L 12/50; H04Q 11/00
[52] U.S. Cl. ................................ 379/67; 379/67; 379/88; 379/89; 379/201; 379/399; 370/355; 370/364
[58] Field of Search ................................ 379/67, 88, 89, 379/201, 399; 370/355, 364

[56] References Cited

U.S. PATENT DOCUMENTS

| | | | |
|---|---|---|---|
| 4,908,850 | 3/1990 | Masson et al. | 379/88 |
| 5,195,128 | 3/1993 | Knitl | 379/67 |
| 5,222,125 | 6/1993 | Creswell et al. | 379/67 |
| 5,384,831 | 1/1995 | Creswell et al. | 379/67 |
| 5,434,909 | 7/1995 | Price et al. | 379/88 |
| 5,490,206 | 2/1996 | Stern | 379/67 |
| 5,493,608 | 2/1996 | O'Sullivan | 379/88 |
| 5,495,522 | 2/1996 | Allen et al. | 379/202 |
| 5,506,890 | 4/1996 | Gupta et al. | 379/67 |
| 5,511,111 | 4/1996 | Serbetcioglu et al. | 379/67 |

*Primary Examiner*—Fan S. Tsang
*Assistant Examiner*—Allan Hoosain
*Attorney, Agent, or Firm*—Robert E. Bushnell, Esq.

[57] ABSTRACT

An automatic transferring apparatus for an exchange and a method therefor which automatically transfers an office line incoming call to an extension line includes: a unit connected to a switching circuit for converting received serial vocal data into parallel data; a memory for directly storing without further conversion the parallel-converted vocal data as a vocal guide message; a unit connected to the switching circuit for converting a DTMF signal into digital data; a unit for converting the parallel vocal data output from the memory into serial vocal data, and outputting it to the switching circuit; a unit for directly time slots assignment of the serial/parallel converting unit and parallel/serial converting unit; a unit connected to an exchange controller for receiving a command for automatic transfer; and an automatic transfer controller for controlling the memory in a recording mode to thereby store the parallel-converted vocal data as a vocal guide message, the controller outputting the vocal guide message by controlling the memory in automatic transfer mode, the controller outputting a received DTMF signal to the exchange controller as an extension number.

3 Claims, 20 Drawing Sheets

METHOD AND APPARATUS FOR AUTOMATICALLY TRANSFERRING A CALLER TO A SELECTED EXTENSION

CLAIM OF PRIORITY

This application make reference to, incorporates the same herein, and claims all benefits accruing under 35 U.S.C §119 from two applications entitled *AUTOMATIC TRANSFERRING SYSTEM AND METHOD FOR EXCHANGE* earlier filed in the Korean Industrial Property Office on 17 Jun. 1995 and 27 Nov. 1995 and there assigned Serial Nos. 16185/1995 and 43980/1995 respectively.

BACKGROUND OF THE INVENTION

1. Field of the Invention

The present invention relates to a method and apparatus for automatically transfering an incoming call on an office line to an extension selected by the caller.

2. Description of the Related Art

In an exchange having an automatic transferring function, an exchange controller is provided for controlling communication switching and for controlling the entire operation of the exchange in order to provide various kinds of services to a user. A memory stores a program and initial service data of the exchange controller for performing various functions and temporarily stores the data processed by the exchange controller. A switching circuit switches various tones and vocal data under the control of the exchange controller and a subscriber circuit supply communication current to each of the subscriber's telephone under the control of the exchange controller and interfaces each of the subscriber's telephones to the switching circuit. A ring generator generates ring signals and supplies them to the subscriber's line and a tone generator generates various tone signals under the control of the exchange controller and outputs the selected signals to the switching circuit. An office line seizes the office line under the control of the exchange controller to form an office line communication loop and interfaces the office line with the switching circuit. An automatic transferring part performs the function of the automatically connecting a calling office line to an extension under the control of the exchange controller in a music generator produces music on "hold" under the control of the exchange controller.

During the process of performing automatic transfer and such an exchange, when an incoming call is effected by an office line caller, the office line circuit informs the exchange controller of this fact and the exchange controller detects the office line call and controls the switching circuit to form a communication path between the automatic transferring part and the office line. The automatic transferring part outputs a vocal guide message for automatic transfer to the switching circuit. When the office line caller listens to the vocal guide message and then dials the extension subscriber's number in response thereto, the exchange controller receives the extension subscriber's number through the automatic transferring part and the exchange controller determines if the extension subscriber is available. If so, the tone generator outputs a ring tone to the office line caller and connects the output of the ring generator to the line of the corresponding extension subscriber. If the extension subscriber picks up his extension, then the exchange controller detects this and controls the switching circuit to connect the part of the subscriber circuit to the part of the office line so as to form a communication path therebetween.

In an earlier automatic transferring part, each port of the subscriber circuit requires a serial to parallel converter, a second buffer, a memory, and an address logic portion, and a memory enable logic portion in order to record or reproduce the vocal guide message in the memory. Such a multiplicity of elements is not needed in the present invention due to the use of time-division allocation.

U.S. Pat. No. 5,506,890, to Gupta, et al. discloses a method and apparatus for group-specific calling in which a caller first receives a recorded message and is subsequently connected to a particular telephone extension depending upon the caller's response to the recorded message.

Similarly, U.S. Pat. Nos. 5,222,125 and 5,384,831, to Creswell, et al., also disclose telephone systems in which a caller initially receives a recorded message and is then connected to other system functions in response to further input from the caller.

However, none of the three aforecited patents teach or suggest the use of time-division allocation in the fashion of the present invention.

SUMMARY OF THE INVENTION

Therefore, it is an object of the present invention to provide a method and apparatus for performing an automatic transfer in an exchange, with a simple configuration.

It is another object of the present invention to provide an automatic transferring method and apparatus for offering an automatic transfer function commonly for multiple channels in an exchange having the automatic transfer function.

It is still another object of the present invention to provide an automatic transferring apparatus connected to an exchange controller for storing vocal data received through a channel designated in a recording mode, assigning a channel for effecting a vocal guide to transmit vocal guide data in the automatic transfer mode, and for converting a received DTMF signal into an extension signal to be output to the exchange controller.

In order to accomplish the objects of the present invention, there is provided an automatic transferring method and apparatus for an exchange which automatically transfers an office line incoming call to an extension line, the equipment comprising: a unit connected to a switching circuit for converting received serial vocal data into parallel data; a memory for directly storing without further conversion the parallel-converted vocal data as a vocal guide message; a unit connected to the switching circuit for converting a DTMF signal into digital data; a unit for directly converting the parallel vocal data output from the memory into serial vocal data, and for outputting it to the switching circuit; a unit for time slot assignments assignment of the serial/parallel converting unit and parallel/serial converting unit; a unit connected to an exchange controller for receiving a command for automatic transfer; and an automatic transfer controller for controlling the memory in a recording mode to thereby store the parallel-converted vocal data as a vocal guide message, the controller outputting the vocal guide message by controlling the memory in the automatic transfer mode, the controller outputting a received DTMF signal to the exchange controller as an extension number.

For another object of the present invention, there is further provided a method for operation of an exchange having automatic transferring equipment and in which an exchange controller forms a communication path to the automatic transferring equipment to thereby automatically transfer an office line incoming call to a specific extension, the method comprising the steps of: parallel-converting serial vocal data input when a recording mode command is received, and directly storing without further conversion it as a vocal guide message; directly serial-converting the stored vocal guide message when an automatic transfer mode command is received; detecting a DTMF signal received after the output of the vocal guide message as an extension signal; and outputting the extension number to the exchange controller, and finishing automatic transfer, whereby the exchange controller controls a switching circuit to automatically connect the communication path between an incoming office line and a selected extension.

DETAILED DESCRIPTION OF THE PREFERRED EMBODIMENT

Figure 1:
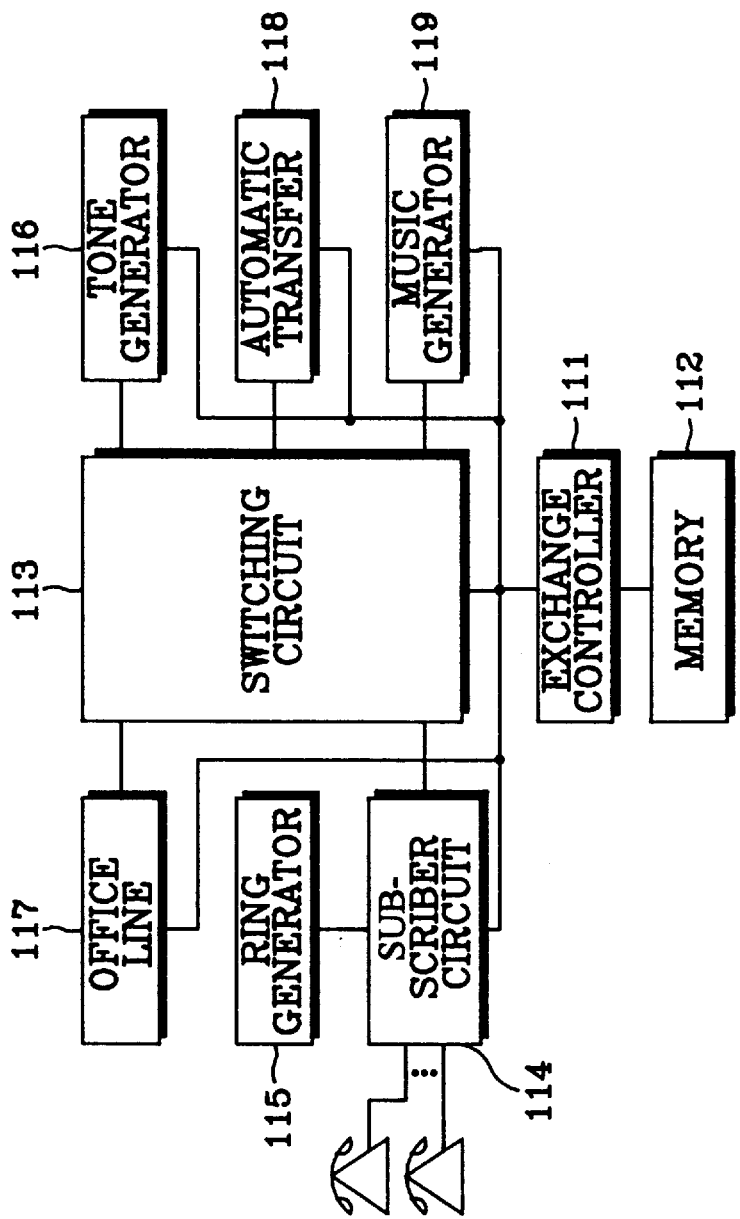
FIG. 1 is a block diagram of an exchange which performs an automatic transfer.

FIG. 1 shows an exchange having an automatic transferring function. Referring to FIG. 1, exchange controller 111 controls communication switching, and controls the entire operation of the exchange in order to provide various kinds of service to a user. A memory 112 stores a program and initial service data of the exchange controller 111 for performing a basic call and various functions, and temporarily stores the data processed by the exchange controller 111. The memory 112 is composed of a ROM for storing the program and service data, and a RAM for temporarily storing data generated during the performance of the program. A switching circuit 113 switches various tones and vocal data under the control of the exchange controller 111. A subscriber circuit 114 supplies communication current to each of the subscriber's telephones under the control of exchange controller 111, and interfaces each of the subscriber's telephones to the switching circuit 113. A ring generator 115 generates a ring signal and supplies it to the subscriber's line. A tone generator 116 generates various tone signals under the control of the exchange controller 111, and outputs the signals to the switching circuit 113. An office line 117 seizes the office line under the control of the exchange controller 111 to form an office line communication loop and interfaces the office line with the switching circuit 113. Here, the office line indicates a line to connect the office line 117 to the exchange. The automatic transferring part 118 performs a function to automatically connect a calling office line to an extension under the control of the exchange controller 111. A music generator 119 produces music under the control of the exchange controller 111.

According to a process of performing an automatic transfer operation in the exchange constructed as above, when an incoming call is effected by an office line caller, the office line circuit 117 informs exchange controller 111 of this fact. The exchange controller 111 detects the office line incoming call, and controls switching circuit 113 to form a communication path between the automatic transferring part 118 and the office line. The automatic transferring part 118 outputs a vocal guide message for automatic transfer to the switching circuit 113. When the office line caller listens to the vocal guide message and then dials the extension subscriber's number in response to thereto, then exchange controller 111 receives the extension subscriber's number through the automatic transferring part 118. The exchange controller 111 controls the music generator 119 to supply "hold" music to the office line caller, and analyzes the port of the subscriber circuit 114 to thereby check the state of a corresponding extension subscriber. If a corresponding extension subscriber is free, the exchange controller 111 controls the tone generator 117 to output a ring back tone to the office line caller and to connect the output of the ring generator 115 to the line of the corresponding extension subscriber. The office line caller receives the ring back tone, and the extension subscriber is provided with the ring signal. If the extension subscriber picks up his extension, then the exchange controller 111 detects the off-hook condition through the subscriber circuit 114, and controls the switching circuit 113 to connect the port of subscriber circuit 114 and the port of office line 117. By doing so, the incoming office line and the corresponding extension are connected together to form a communication path.

Figure 2:
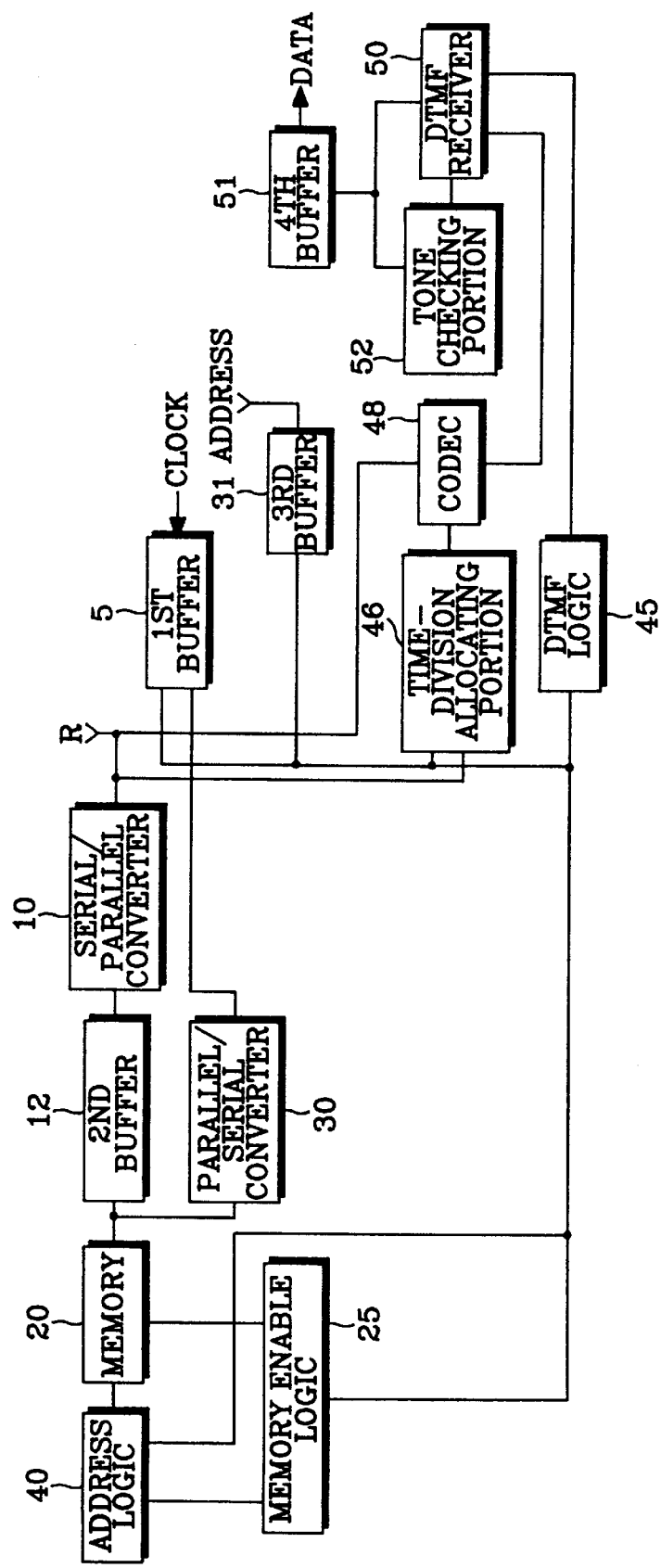
FIG. 2 is a block diagram of a conventional automatic transfer system for an exchange.

FIG. 2 shows a conventional automatic transferring part shown in FIG. 1, which was filed by the Applicant and issued on Oct. 22, 1992 as Korean Patent Publication No.

9783. This conventional automatic transferring part requires a serial/parallel converter 10, second buffer 12, memory 20, address logic portion 40, and memory enable logic portion 25 for every port in order to record or reproduce the vocal guide message in the memory 20.

Hereinafter, a preferred embodiment of the present invention will be described with reference to the attached drawings. The configuration of the exchange of the present invention is the same as that of FIG. 1 except for automatic transferring part 118, and therefore by like components are designated by like numerals.

Figure 3:
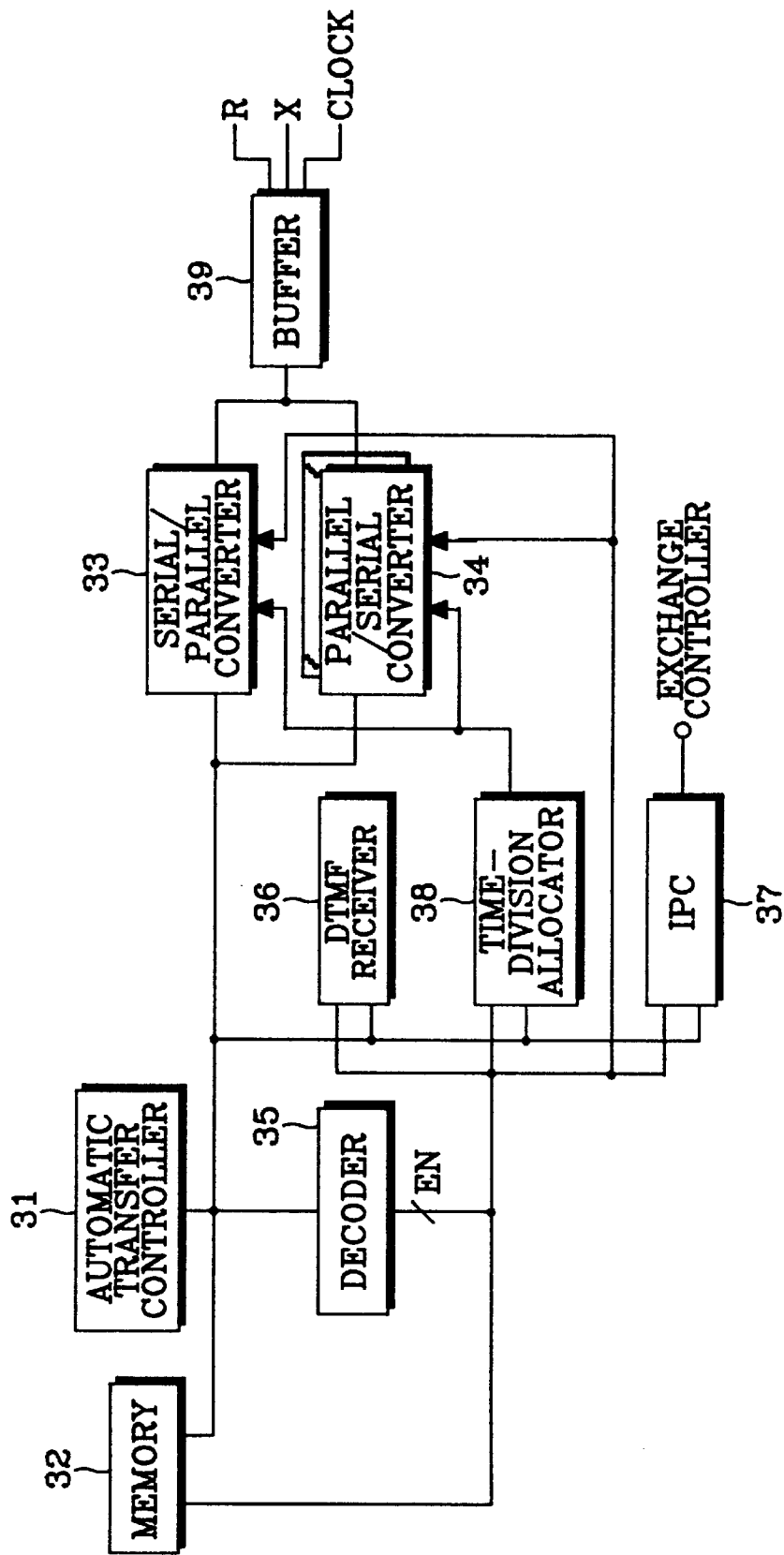
FIG. 3 is a block diagram of an automatic transferring part of the present invention in the exchange which performs automatic transfer.

Referring to FIG. 3, an automatic transfer controller 31 controls the entire operation of the automatic transferring part 118 in order to perform automatic transfer. A memory 32 stores vocal data received in the recording mode as a vocal message for guiding the automatic transfer under the control of automatic transfer controller 31, outputs the corresponding vocal guide message in the automatic transfer mode, and stores program and service data of the automatic transfer controller 31.

A buffer 39 is connected to the switching circuit 113. The buffer performs inputting/outputting to the highway transmitting stage X, and the highway receiving stage R of the exchange, the clock and address. A serial/parallel converter 33 is connected to the input of buffer 39 through its output stage. The serial/parallel converter 33 parallel-converts the serial vocal data for guiding automatic transfer. A parallel/serial converter 34 is connected to buffer 39 through its output stage, and serial-outputs the parallel vocal guide message reproduced from memory 32.

A DTMF receiver 36 converts a received DTMF signal into digital data, and outputs it to the automatic transfer controller 31 as an extension line number. Time-division allocator 38 assigns time slots for time-division controlling the serial/parallel converter 33 and the parallel/serial converter 34 under the control of the automatic transfer controller 31. An IPC unit 37 is connected to the exchange controller 111, and performs message communication between the exchange controller 111 and the automatic transfer controller 31. A decoder 35 controls the enabling of the serial/parallel converter 33, memory 32, parallel/serial converter 34, IPC unit 37, time-division assignment portion 38, and DTMF receiver 36.

In the description of operation of the automatic transferring part 118 with reference to the above-stated configuration, the automatic transfer controller 31 communicates the IPC message with the exchange controller 111 through the IPC unit 37. Here, the IPC messages may include messages for initialization, recording and playback of the automatic transfer controller 118.

Figure 4:
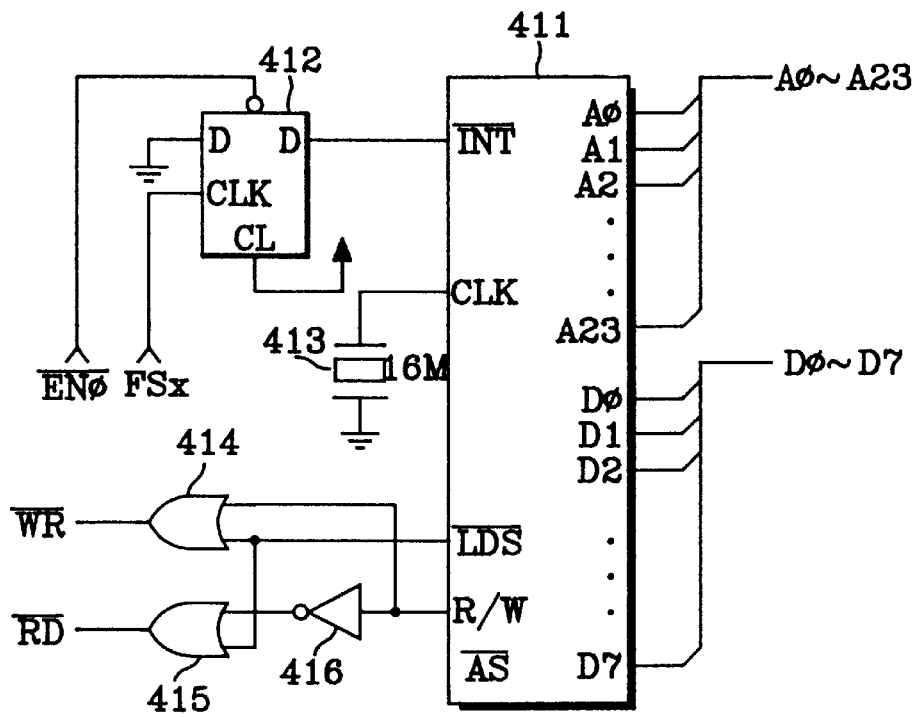
FIG. 4 is a circuit diagram of the automatic transfer controller of FIG. 3.

Referring to FIG. 4, a CPU 411 is connected to a data bus and address bus. Addresses A0–A20 of the CPU 411 are for accessing memory 32, and addresses A21–A23 for controlling the respective portions of automatic transferring part 118 through decoder 35. Latch 412 receives signal $\overline{EN\emptyset}$ and sync clock FSx output from decoder 35, and generates the interrupt signal of the CPU 411. OR gate 414 logically sums signals $\overline{LDS}$ and R/W output from the CPU 411, and generates a mode signal $\overline{WR}$ for recording the vocal guide data. OR gate 415 logically sums signal $\overline{LDS}$ and signal ($\overline{R/W}$) inverted through inverter 416, and generates a mode signal $\overline{RD}$ for reproducing the vocal guide data.

Figure 6:
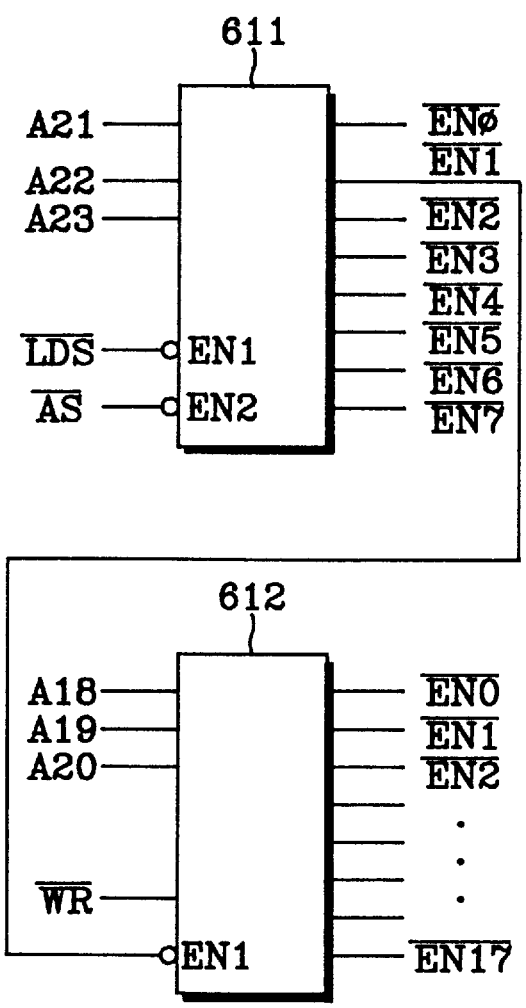
FIG. 6 is a circuit diagram of the decoder of FIG. 3.

Referring to FIG. 6, there are two 3*8 decoders 611 and 612 in order to generate enable signals $\overline{EN0}$–$\overline{EN7}$ for selecting the respective components of automatic transferring part 118. Here, decoder 611 operates when control signals $\overline{LDS}$ and $\overline{AS}$ output from CPU 411 are enabled in a low logic state so that input addresses A21–A23 are decoded and output. Here, the decoding result signals output from decoder 611 are as shown in the following TABLE 1 when signals $\overline{LDS}$ and $\overline{AS}$ are both 0.

TABLE 1

| A23 | A22 | A21 | ENABLE SIGNAL | REMARKS |
|---|---|---|---|---|
| 0 | 0 | 0 | $\overline{EN0}$ | CPU INTERRUPT |
| 0 | 0 | 1 | $\overline{EN1}$ | ENABLE DECODER 612 |
| 0 | 1 | 0 | $\overline{EN2}$ | ENABLE IPC MESSAGE TRANSMISSION |
| 0 | 1 | 1 | $\overline{EN3}$ | ENABLE IPC MESSAGE TRANSMISSION |
| 1 | 0 | 0 | $\overline{EN4}$ | ENABLE IPC MESSAGE RECEPTION |
| 1 | 0 | 1 | $\overline{EN5}$ | ENABLE IPC MESSAGE RECEPTION |
| 1 | 1 | 0 | $\overline{EN6}$ | ENABLE RAM SELECTION |
| 1 | 1 | 1 | $\overline{EN7}$ | ENABLE ROM SELECTION |

The decoding result signals output from decoder 612 are as shown in the following TABLE 2 when signals $\overline{EN1}$ and $\overline{WR}$ are both 0.

TABLE 2

| A20 | A19 | A18 | ENABLE SIGNAL | REMARKS |
|---|---|---|---|---|
| 0 | 0 | 0 | $\overline{EN10}$ | ENABLE 1st PARALLEL/SERIAL CONVERTER |
| 0 | 0 | 1 | $\overline{EN11}$ | ENABLE 2nd PARALLEL/SERIAL CONVERTER |
| 0 | 1 | 0 | $\overline{EN12}$ | ENABLE 3rd PARALLEL/SERIAL CONVERTER |
| 0 | 1 | 1 | $\overline{EN13}$ | ENABLE 4th PARALLEL/SERIAL CONVERTER |
| 1 | 0 | 0 | $\overline{EN14}$ | ENABLE 5th PARALLEL/SERIAL CONVERTER |
| 1 | 0 | 1 | $\overline{EN15}$ | ENABLE 6th PARALLEL/SERIAL CONVERTER |
| 1 | 1 | 0 | $\overline{EN16}$ | ENABLE 7th PARALLEL/SERIAL CONVERTER |
| 1 | 1 | 1 | $\overline{EN17}$ | ENABLE 8th PARALLEL/SERIAL CONVERTER |

The decoding signals shown in TABLES 1 and 2 perform the enabling function of the respective components of the automatic transferring part 118 for the purpose of automatic transfer.

Figure 5:
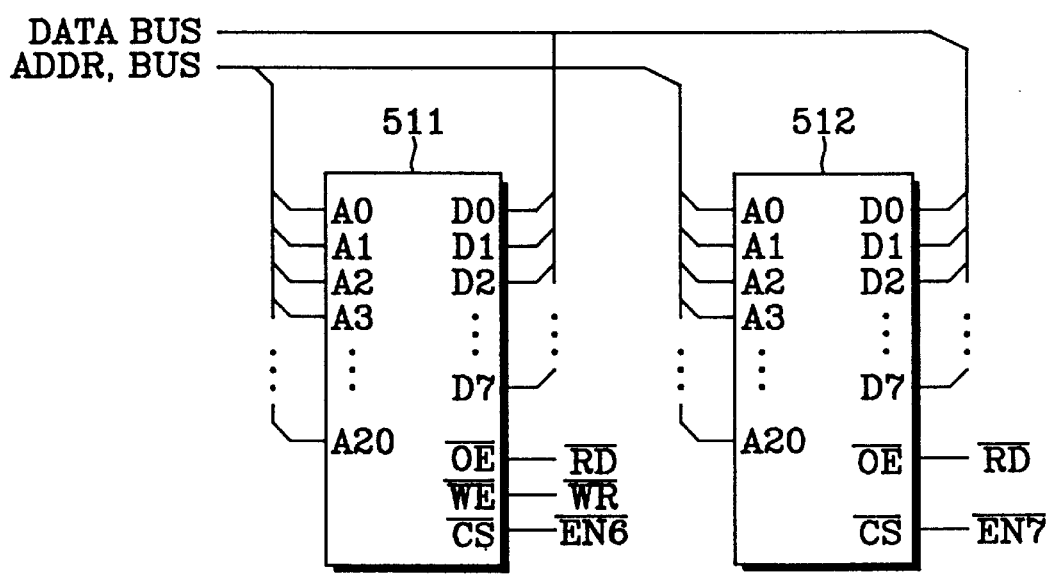
FIG. 5 is a circuit diagram of the memory shown in FIG. 3.

Referring to FIG. 5, as an SRAM, RAM 511 is a memory for variably recording or reproducing the vocal guide message by the operator in order to perform the automatic transfer of the exchange. ROM 512 is a memory for storing a predetermined vocal guide message for performing the automatic transfer of the exchange. In case of an exchange for performing automatic transfer, there are commonly used vocal guide messages, a trade name used for a purchaser, and other vocal guide messages varying with the operation mode. ROM 512 stores predetermined vocal guide messages which can be used in any exchange. RAM 511 stores variable vocal guide messages for use in a corresponding exchange. An area for storing a program for performing the automatic transfer is allocated in ROM 512. A working memory area for temporarily storing data generated during the program is allocated in RAM 511.

Figure 10A:
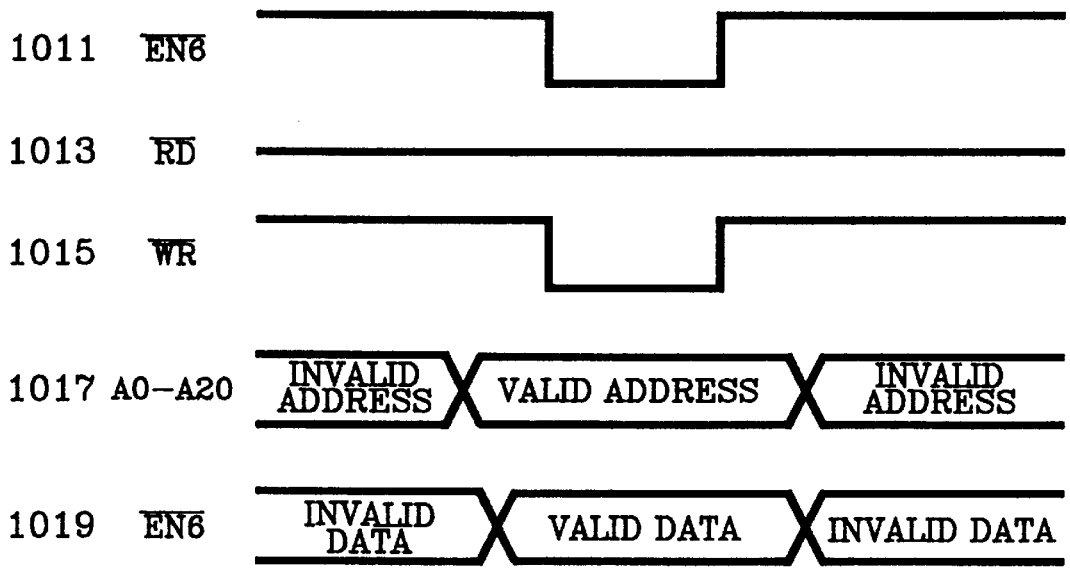
FIGS. 10A and 10B are waveform timing diagrams showing the timing for accessing vocal data of the memory in the automatic transfer controller of the present invention.
Figure 10B:
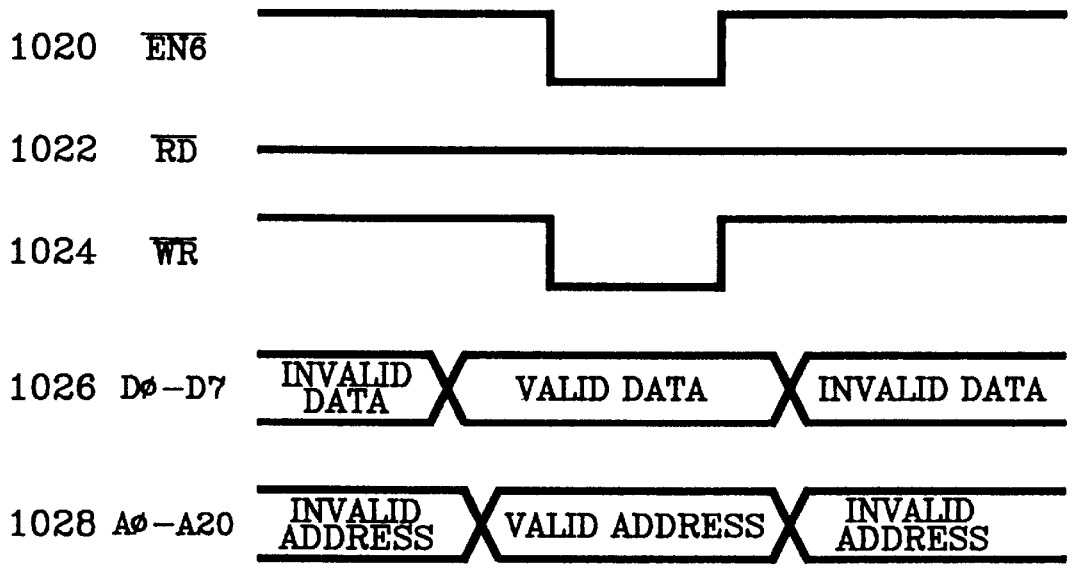

FIG. 10A is waveform diagram which shows a timing for recording the variable vocal guide messages in RAM 511 of memory 32. FIG. 10B is a waveform diagram which shows a timing for reproducing the vocal guide messages recorded in RAM 511 and ROM 512 of memory 32.

First of all, during recording, CPU 411 outputs signals $\overline{LDS}$, $\overline{AS}$ an R/ at a low logic level, and outputs addresses—A20–A0 for setting a recording position in RAM 511 and addresses A23–A21 for selecting RAM 511 as "110". As shown in FIG. 10A, RAM 511 stores data received in the positions of addresses A20–Aø designated during a period during which signal $\overline{EN6}$ and write control signal $\overline{WR}$ are at a low logic level. Here, data D7–D0 is the variable vocal message.

During playback, there are two cases of reproducing the variable vocal guide message of RAM 511 and reproducing the predetermined vocal guide message of ROM 512. When the variable vocal guide message recorded in RAM 511 is reproduced, CPU 411 outputs signals $\overline{LDS}$ and $\overline{AS}$ in a low logic, outputs the R/W signal at a high logic level, and outputs addresses A20–A0 for setting the recording position in RAM 511 and addresses A23–A21 for selecting RAM 511 as "110". As shown in FIG. 10B, RAM 511 reproduces the message recorded in the positions of addresses A20–Aø designated during a period during which signal $\overline{EN6}$ and read control signal $\overline{RD}$ are at a low logic level. Here, data D7–D0 is the reproduction of the variable vocal guide message recorded in RAM 511.

For the playback of the predetermined vocal guide message recorded in ROM 512, CPU 411 outputs signal $\overline{LDS}$ and $\overline{AS}$ as low logic level signals, and outputs the R/W signal at a high logic level. Then, the CPU outputs addresses A20–A0 for setting the playback positions in ROM 512 and addresses for selecting ROM 512 as "111". As shown in FIG. 10B, ROM 512 reproduces the messages stored in the positions of addresses A20–Aø designated during a period during which signal $\overline{EN7}$ and read control signal $\overline{RD}$ are at a low logic level. Here, data D7–D0 is the reproduction of the predetermined vocal guide message stored in ROM 512.

Figure 7:
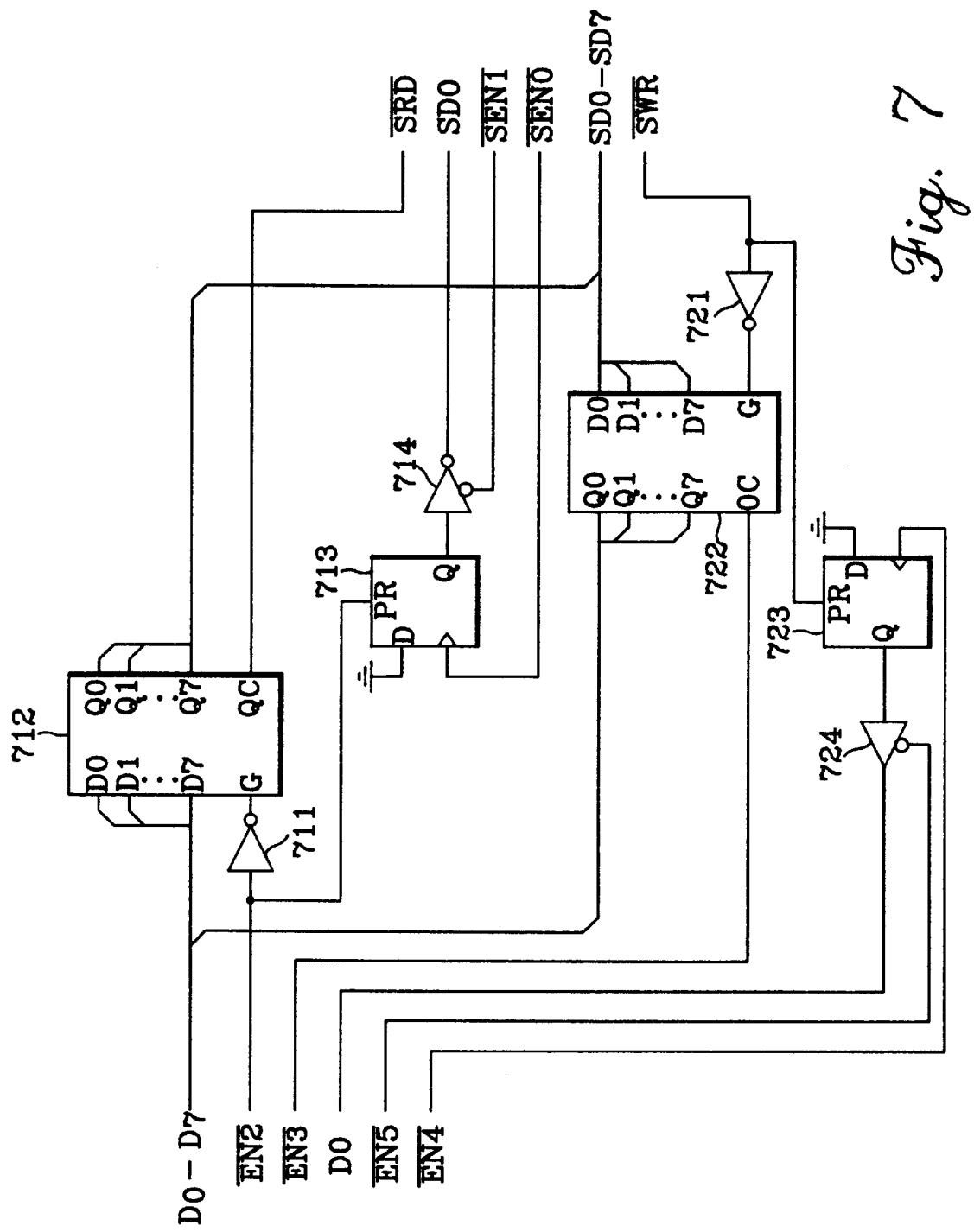
FIG. 7 is a circuit diagram of the IPC (interprocessor communication) unit of FIG. 3.

Referring to FIG. 7, the IPC 37 unit includes a unit for transmitting the IPC message to the automatic transfer controller 31 from the exchange controller 111, and a unit for transmitting the IPC message to the exchange controller 111 from the automatic transfer controller 31. These two units have the same configuration.

When the IPC message generated from automatic transfer controller 31 is transmitted to exchange controller 111, inverter 711 inverts signal $\overline{EN2}$ and outputs it to the enable port of tri-state latch 712. The input ports of—tri-state latch 712 are connected to data buses D7–D0, and the tri-state output ports of latch 712 are connected to data buses SD7–SD0. The output enable ports of the latch are connected to read control signal $\overline{SRD}$ of exchange controller 111. The set port of latch 713 is connected to signal $\overline{EN2}$, and its clock port is to signal $\overline{SEN0}$ output from the exchange controller 111. Tri-state buffer 714 is connected between latch 713 and the exchange data bus SD0, and its control port is connected to signal $\overline{SEN1}$ output from exchange controller 111.

When the IPC message generated from exchange controller 111 is transmitted to automatic transfer controller 31, inverter 721 inverts write control signal $\overline{SWR}$ output from exchange controller 111, and outputs it to the enable port of tri-state latch 722. The input ports of tri-state latch 722 are connected to data buses SD7–SD0 of the exchange, and its output ports are connected to data buses D7–D0 of automatic transferring part 118. The output enable port of the latch is connected to signal $\overline{EN3}$. The set port of latch 723 is connected to signal $\overline{SWR}$, and its clock port is connected to signal $\overline{EN4}$. Tri-state buffer 724 is connected between latch 723 and data bus D0 of automatic transfer controller 31. The control port of the buffer is connected to signal $\overline{EN5}$ output from automatic transferring part 118.

Figure 11A:
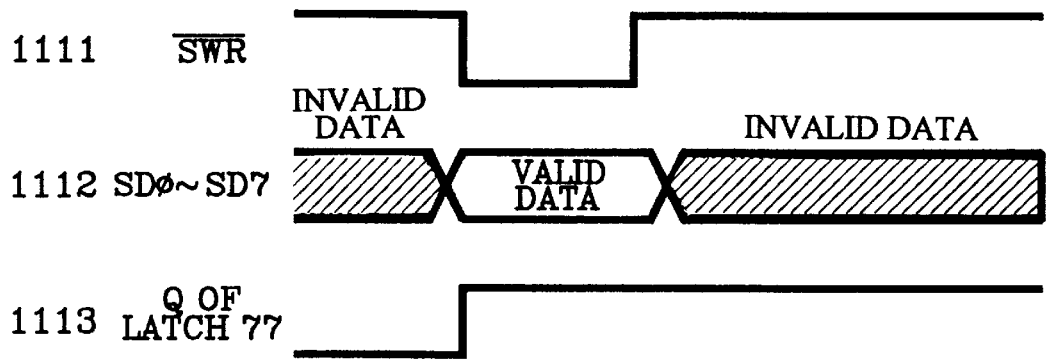
FIGS. 11A–11D are waveform timing diagrams showing the timing for receiving an IPC message transmitted from the exchange controller in the automatic transfer controller and the timing for receiving the IPC message transmitted from the automatic transfer controller in the exchange controller of the present invention.
Figure 11B:
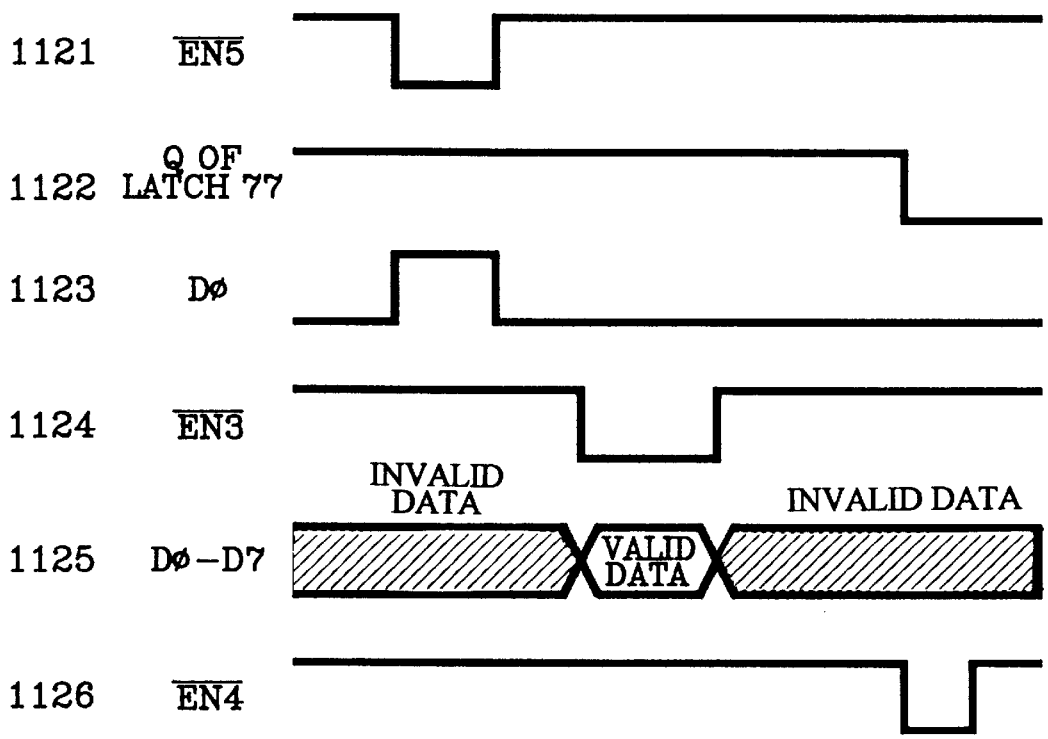
Figure 11C:
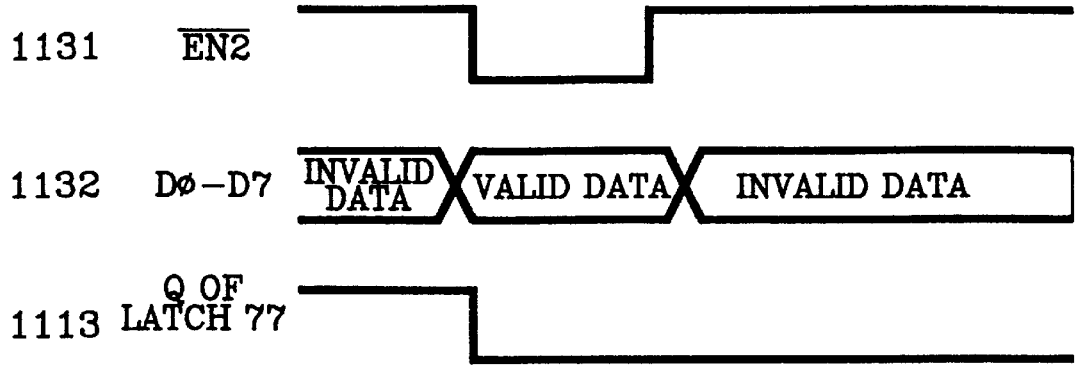
Figure 11D:
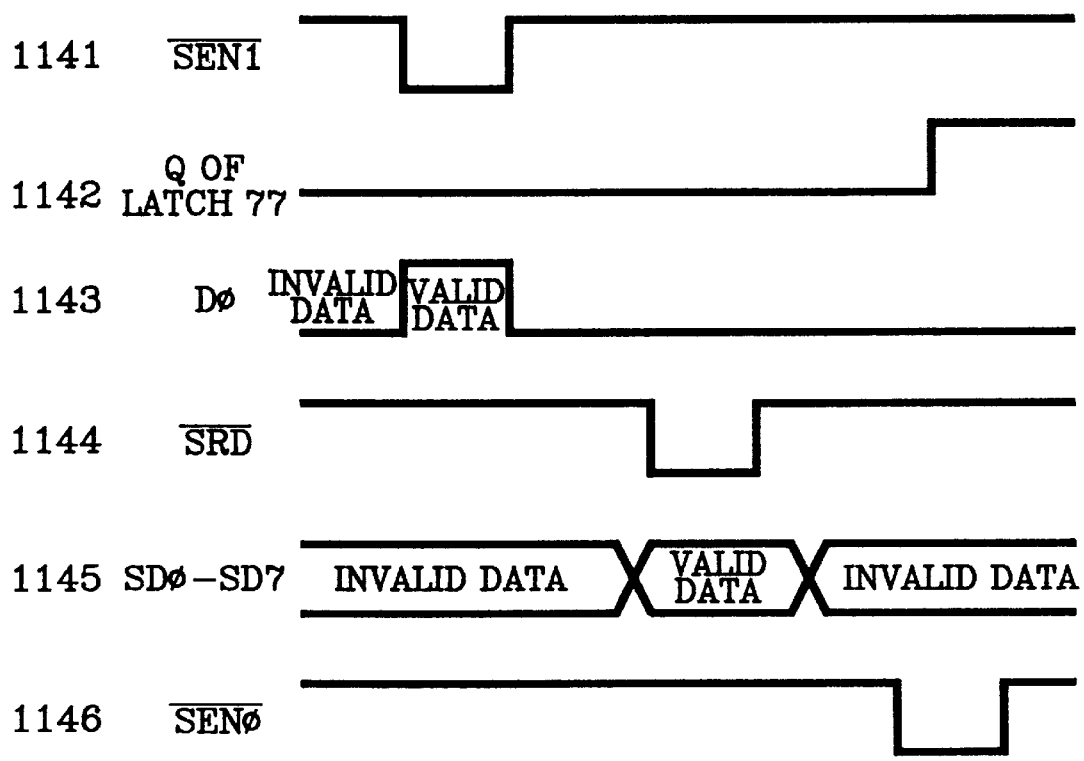

FIG. 11A shows a timing when the IPC message is transmitted to the IPC unit 37 from the exchange controller 111. FIG. 11B shows a timing when the IPC message transmitted to IPC 37 unit is received by automatic transfer controller 31. FIG. 11C shows a timing when the IPC message is transmitted to the IPC unit 37 from automatic transfer controller 31. FIG. 11D shows a timing when the IPC message transmitted to IPC unit 37 is received by the exchange controller 111.

First of all, the operation of receiving the IPC message transmitted from exchange controller 111 will be explained with reference to FIGS. 11A and 11B. Exchange controller 111 transmits the IPC message to data buses SD7–SD0 of the exchange as shown by 1112, and outputs write control signal $\overline{SWR}$ as shown by 1111. Tri-state latch 722 receives the IPC message input through data buses SD7–SD0 of the exchange by write control signal $\overline{SWR}$, and internally stores the received message. Latch 723 outputs a high-logic signal as when by 1113 by write control signal $\overline{SWR}$ in order to indicate that the IPC message is received.

In this state, in order to confirm that the IPC message is received, automatic transfer controller 31 outputs addresses A23–A21 for generating signals $\overline{EN5}$ and $\overline{EN4}$ for a predetermined period. As shown in TABLE 1, addresses A23–A21 are output as "101" and "100" for a predetermined period so that signals $\overline{EN5}$ and $\overline{EN4}$ are output. Here, signal $\overline{EN5}$ is to confirm whether or not the IPC message has been received by reading the output of latch 723 by automatic transfer controller 31. Signal $\overline{EN4}$ is to initialize the output of latch 723 by automatic transfer controller 31. Therefore, automatic transfer controller 31 generates signal $\overline{EN5}$ and receives the output of latch 723 in order to confirm whether or not the IPC message has been received. After a time period expired, the controller generates signal $\overline{EN4}$ to initialize latch 723, and waits for the next IPC message.

As shown in FIG. 11B, automatic transfer controller 31 outputs signal $\overline{EN5}$ at a low logic level as shown by 1121. Then, tri-state buffer 724 connected to data bus D0 is enabled so that the output of latch 723 is applied to automatic transfer controller 31. Automatic transfer controller 31 analyzes the logic state of D0 in order to confirm whether or not the IPC message has been received. Here, when D0 is at a high logic level as shown by 1123, the automatic transfer controller 31 detects that the IPC message has been received, and outputs addresses—A23–A21 as "011" in order to generate signal $\overline{EN3}$ as shown by 1124. Decoding part 35 generates signal $\overline{EN3}$ as shown by 1124. Tri-state latch 722 outputs the internally stored IPC message enabled by signal $\overline{EN3}$ to data buses D7–D0. Thereafter, the automatic transfer controller 31 receives and analyzes the IPC message of data buses D7–D0, and performs an operation corresponding to a predetermined command. In order to prepare for the reception of the next IPC message, signal $\overline{EN4}$ is output as shown by 1126. Latch 723 whose input port is connected to ground receives signal $\overline{EN4}$ through its clock port so that it is initialized to generate a low logic level output.

However, if the D0 data received after the output of signal $\overline{EN5}$ is at a low logic level, this means that there is no reception of an IPC message. In this case, the automatic transfer controller 31 does not generate signal $\overline{EN3}$, but rather generates signal $\overline{EN5}$ after a set time period. If the IPC message is not received, it is noted that automatic transfer controller 31 enables the IPC message receiving unit but does not perform the reading of the IPC message.

Referring to FIGS. 11C and 11D, the operation in which automatic transfer controller 31 outputs the IPC message and exchange controller 111 receives it would be understood by referring to the operation in which the exchange controller 111 outputs the IPC message and the automatic transfer controller 31 receives it. For this reason, the former operation will not be explained.

Figure 8:
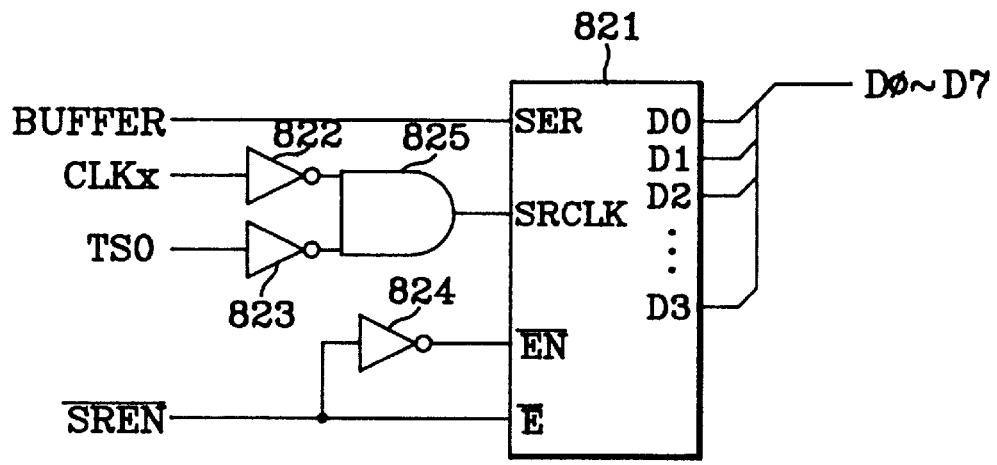
FIG. 8 is a circuit diagram of the serial/parallel converter of FIG. 3.

Referring to FIG. 8, inverters 822 and 823 and AND gate 825 negative-OR operate clock CLKx and time slot designation signal TS0, and generates the result as a shift clock SRCLK. The serial input port of shift register 821 is connected to buffer 39. The output of AND gate 825 is received as shift clock SRCLK. Signal $\overline{SREN}$ is input as an enable signal. The output ports of the register are connected to the data bus. The serial/parallel converter 33 is designed to service for one port regardless of the number of channels serviceable. Time slot designation signal TS0 is used by being fixed to a time slot of 32 channels. Serial/parallel converter 33 converts the serial variable vocal data received from highway into parallel data in the recording mode.

Figure 13:
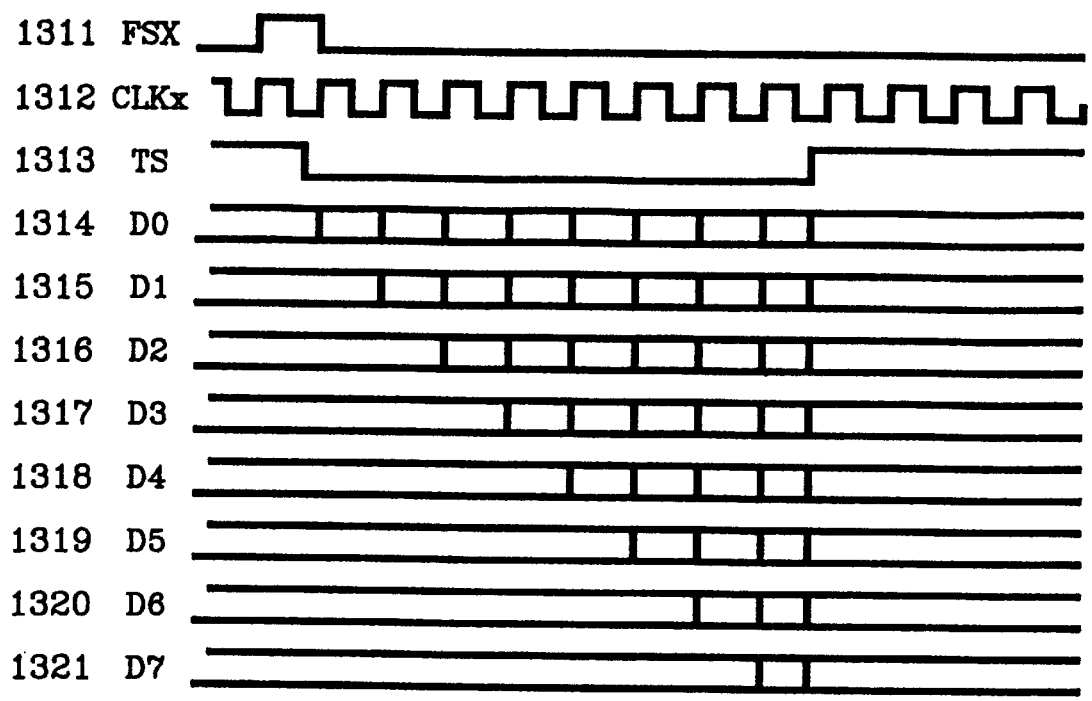
FIG. 13 is a waveform timing diagram showing the timing for converting serial data received from the serial/parallel converter via a highway into parallel data.

FIG. 13 is a timing diagram in which serial/parallel converter 33 converts the serial data received through the highway into parallel data and outputs it to the data bus. In this drawing, there is suggested a case in which the number 0 time slot is used.

For the operation of serial/parallel converter 33 with reference to FIG. 13, when shift clock SRCLK in which clock CLK x and time slot designation signal TS0 are negative-OR-operated is input, shift register 821 shifts the serial PCM data of number 0 time slot received from the highway, and converts it into parallel data. Here, if eight shift clocks SRCLK are input, shift register 821 internally stores the eight-bit parallel data. When shift enable signal $\overline{SREN}$ is generated, serial/parallel converter 33 outputs the eight-bit parallel data to data buses D7–D0 and in turn to automatic transfer controller 31. Here, automatic transfer controller 31 detects the parallel data received in the recording mode as the vocal guide message, and controls memory 32 so that parallel-converted PCM data is recorded in RAM 511 as the variable vocal guide message, as described above.

Figure 9:
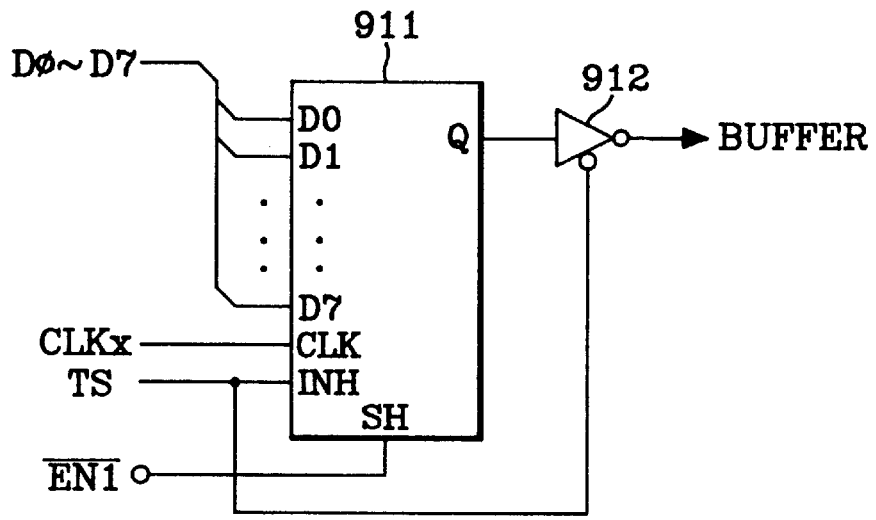
FIG. 9 is a circuit diagram of the parallel/serial converter of FIG. 3.

Referring to FIG. 9, shift register 911 loads the parallel data and shifts it serially so that it is converted into serial data. The input port of shift register 911 is connected to the data bus, and its clock port is connected to clock CLKx. The input port of the shift register is connected to time slot designation signal TS, and its SH port is connected to one of signals $\overline{EN10}$–$\overline{EN17}$ output from decoder 612. Tri-state buffer 912 is connected between the output port of shift register 911 and buffer 39. The control port of the register is connected to time slot designation signal TS. The tri-state buffer 912 outputs the data serially converted in shift register 911 for the period of the designated time slot. The number of parallel/serial converters 34 is equal to the number of serviceable ports. In this embodiment, it is assumed that eight time slots are used at the same time. Therefore, eight parallel/serial converters 34 constructed as in FIG. 9 must be provided.

Figure 14:
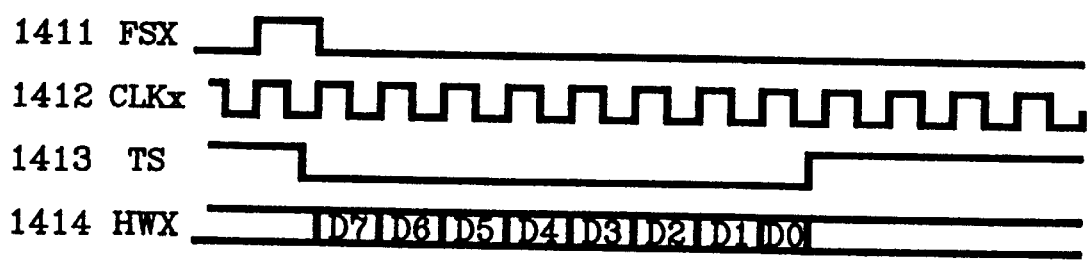
FIG. 14 is a waveform timing diagram showing the timing for converting parallel data into serial data in the serial/parallel converter and outputting the converted data to the highway.

FIG. 14 is a waveform timing diagram of the operating characteristics of parallel/serial converter 34, in which an eight-bit vocal guide message to be transmitted in the playback mode is converted into serial data and output to the highway. FIG. 14 shows a case in which the vocal guide message is output to the number 0 time slot.

According to the operation of outputting the vocal guide message to the highway, with reference to FIG. 14, clock CLK x as shown 1412 of FIG. 14 is input to the clock port of shift register 911. Time-division assignment part 38 receives time slot designation signal TS as an enable signal. Here, signal TS becomes the time slot designation signal for outputting the vocal guide message to the highway. As shown in FIG. 14, shift register 911 converts the eight-bit parallel data into serial data by clock CLKx in a section where time slot designation signal TS is enabled. It is noted therefore that the data finally output from buffer 39 becomes eight-bit serial PCM data in the time slot designated as shown in FIG. 14.

Figure 12A:
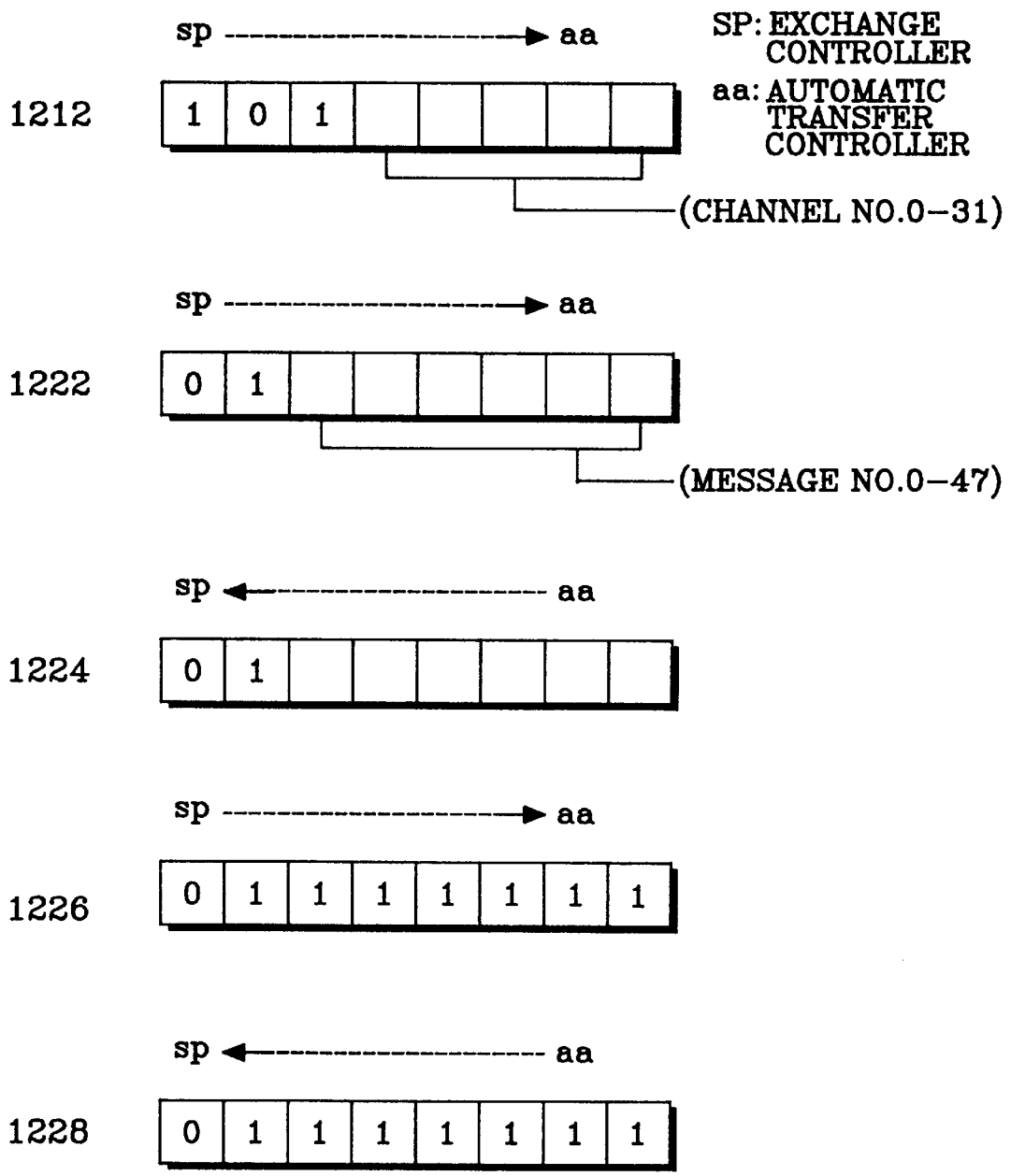
FIGS. 12A–12B show IPC messages to be processed in the exchange controller and automatic transfer controller of the present invention.
Figure 12B:
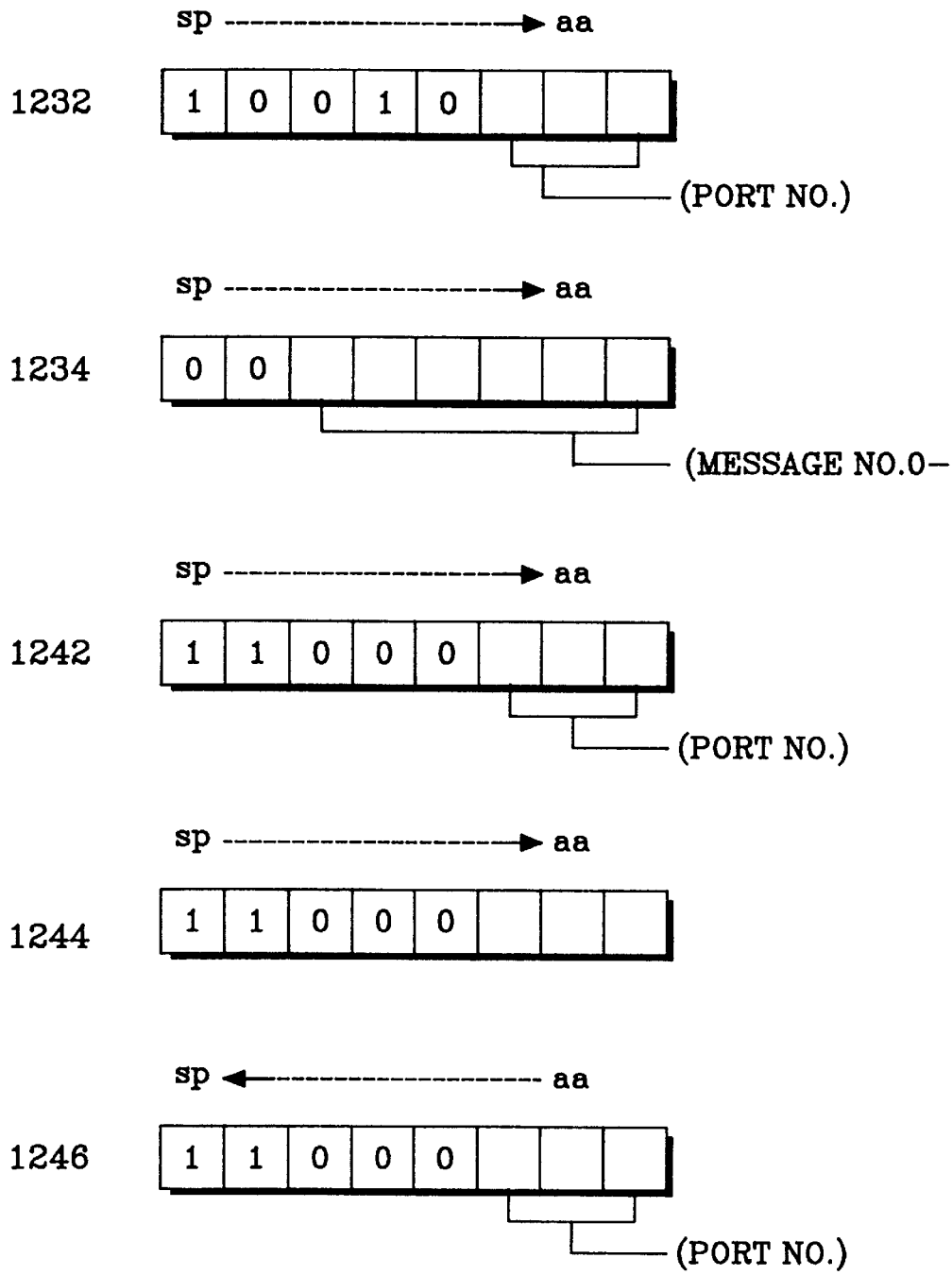

Referring to FIGS. 12A and 12B, message 1212 is an IPC message output to automatic transfer controller 31 from exchange controller 111 for the purpose of channel assigning. In this IPC message for channel assigning, five LSBs serve as data for designating a channel for recording or reproducing the vocal guide message among 32 channels.

Message 1222 is an IPC message output to automatic transfer controller 31 from exchange controller 111 at the recording start point in the recording mode for the purpose of designating a recording number. Six LSBs become data for setting the recording number. In this embodiment, there is suggested a case that a maximum of 64 kinds of vocal guide data can be recorded.

Message 1224 is an IPC message output to exchange controller 111 in the recording mode, in order to inform its corresponding port that automatic transfer controller 31 is under recording. This message responds to the same IPC message as 1222 transmitted from exchange controller 111.

Message 1226 is an IPC message for exchange controller 111 to inform automatic transfer controller 31 that the recording mode is completed.

Message 1228 is an IPC message output to exchange controller 111 by automatic transfer controller 31 when the IPC message indicative of the recording mode completion is received. This message responds to the same IPC message as 1226 transmitted from exchange controller 111.

Message 1232 is an IPC message output to automatic transfer controller 31 in order to designate the number of an output port for reproducing the vocal guide message in exchange controller 111 in the playback mode. This message selects parallel/serial converter 34 to output the vocal guide message. Three LSBs of the IPC message become data for setting the port number.

Message 1234 is an IPC message output to automatic transfer controller 31 at the playback start point in the playback mode in order to set the number of the vocal guide message to be reproduced in exchange controller 111. Six LSBs of this message are data for selecting the vocal guide message to be reproduced from the recorded vocal guide messages. In this embodiment of the present invention, recordable vocal guide messages are 64, and therefore, reproducible vocal guide messages are also 64.

Message 1242 is an IPC message output to automatic transfer controller 31 in the playback mode in order for exchange controller 111 to stop playback. Three LSBs become the number of port which stops playback.

Message 1244 is an IPC message for automatic transfer controller 31 to inform exchange controller 111 that the playback interruption for a corresponding port is completed when exchange controller 111 receives the playback stop IPC message. This message responds to the received IPC message without change.

Message 1246 is an IPC message output to exchange controller 111 from automatic transfer controller 31 in order to indicate the completion of the playback mode. Three LSBs of this message are the number of port completing playback.

In the process of recording the vocal guide message in automatic transferring part 118, exchange controller 111 outputs an IPC message for performing the recording mode through IPC 37. Here, IPC messages like 1212 and 1222 of FIG. 12 A are sequentially output. More specifically, when the IPC message like 1212 is output in order to designate a channel for performing the recording mode, automatic transfer controller 31 confirms the channel number in the channel designation IPC message, and outputs the result to time-division assignment part 38. Then, time-division assignment part 38 outputs time slot designation signal TS to serial/parallel converter 33 in a designated time slot. Automatic transfer controller 31 receiving the IPC message of 1222 for the start of the recording mode analyzes six LSBs of the IPC message to thereby confirm the message number of the vocal guide message to be recorded, and respond thereto. For recording start, automatic transfer controller 31 controls decoding part 35 to enable serial/parallel converter 33. Here, the vocal guide data input to highway receiving port R is serial eight-bit PCM data.

Serial/parallel converter 33 constructed as in FIG. 8 shifts the serial PCM data by shift clock SRCLK and stores it internally. When eight shift clocks SRCLK are input, as shown in FIG. 13, the serial data is converted into eight-bit parallel data. Thereafter, when signal /SREN is generated, serial/parallel converter 33 outputs eight-bit parallel data. It is noted that in the recording mode, the received vocal guide message is variable vocal guide message stored in RAM 511. Then, automatic transfer controller 31 detects the eight-bit parallel data received in the recording mode as the vocal guide message, and controls RAM 511 of memory 32 in order to store the data received in the designated recording number area as the variable vocal guide message. Through the repetition of such a process, the vocal guide message is recorded in memory 32, and the vocal guide message stored in RAM 511 is to perform automatic transfer.

In the process of storing the variable vocal guide message, when the recording is completed, exchange controller 111 outputs the recording completion IPC message like 1226 of FIG. 12A. Automatic transfer controller 31 completes the recording of automatic transferring part 31 by the IPC message, and responds to exchange controller 111 with the same IPC message as 1226 of FIG. 12A.

In the exchange, subscriber circuit 114 becomes SLC, MSLC or DLI according to the kind of telephone used by the user as extension line. In the recording mode, the user can use his own telephone and record a desired vocal guide message.

While the vocal guide message is recorded in automatic transferring part 118, when an incoming signal is generated in the office line, exchange controller 111 controls switching circuit 113 to form a communication path between office line 117 and automatic transferring part 118, and outputs the IPC messages for designating the playback mode in order to output a guide message for automatic transfer to automatic transferring part 118. Here, IPC messages output from exchange controller 111 include a channel designation IPC message like 1212 of FIG. 12A, a port designation IPC message like 1232 of FIG. 12B, and IPC message for designating a message number to be reproduced like 1234 if FIG. 12B.

According to the operation of reproducing the vocal guide messages recorded in automatic transferring part 118, when exchange controller 111 receives the IPC message like 1232 of FIG. 12B for performing the playback mode through the IPC unit 37, decoding part 35 is controlled to enable corresponding parallel/serial converter 34. When the IPC message like 1234 of FIG. 12B, automatic transfer controller 31 reads the vocal guide message corresponding to a recording number stored in memory 32, and transfers it to parallel/serial converter 34 of a designated port. Parallel/serial converter 34 loads the eight-bit parallel data output into memory 32, and converts the parallel vocal guide message into serial data for a period of time slot designation signal TS output from time-division assignment part 38. The result is output it to the highway. Therefore, parallel/serial converter 34 serially converts the eight-bit parallel data parallel-loaded in a section where time slot designation signal TS is enabled, by clock CLKx. It is noted that the data finally output through buffer 39 becomes serial eight-bit PCM data in the designated time slot. Through the repetition of such process, the vocal guide message stored in memory 32 is output to the highway during automatic transfer.

When the vocal guide message is output to the highway, it is transmitted to the office line caller through switching circuit 113 and office line 117. Here, when the office line caller listens to the guide message and dials a telephone number of an extension subscriber, the dialing number is input to automatic transferring part 118 through office line circuit 117 and switching circuit 113. The DTMF receiving part 36 of automatic transferring part 118 converts the DTMF signal into digital data, and outputs it to automatic transfer controller 31. Then, automatic transfer controller 31 outputs the digital data to exchange controller 111 through the IPC unit 37. Exchange controller 111 outputs the playback stop IPC message like 1242 of FIG. 12B to the IPC unit 37 unit of automatic transferring part 118. Automatic transfer controller 113 detects the playback stop IPC message received through the IPC 37, and controls memory 32 and parallel/serial converter 34 to stop the output of the vocal guide message output to the highway. When the playback of the vocal guide message is completed, automatic transfer controller 31 generates the IPC message like 1246 of FIG. 12B, and outputs it to exchange controller 111.

In this state, while the vocal guide message is transmitted or when its transmission is completed, if exchange controller 111 receives an office line number in the automatic transfer controller 31, exchange controller 111 checks the port state of a corresponding extension subscriber of subscriber circuit 114. Here, if the extension subscriber of the received office line number is idle, the output of ring generator 115 is connected to the port of a corresponding extension subscriber to supply a ring signal. If the telephone of the incoming extension subscriber is picked up, switching circuit 113 is controlled to form subscriber circuit 114 and office line circuit 117. However, when the extension subscriber of the received office line is unavailable, then tone generator 116 is controlled to supply a busy tone to the office line.

Figure 15A:
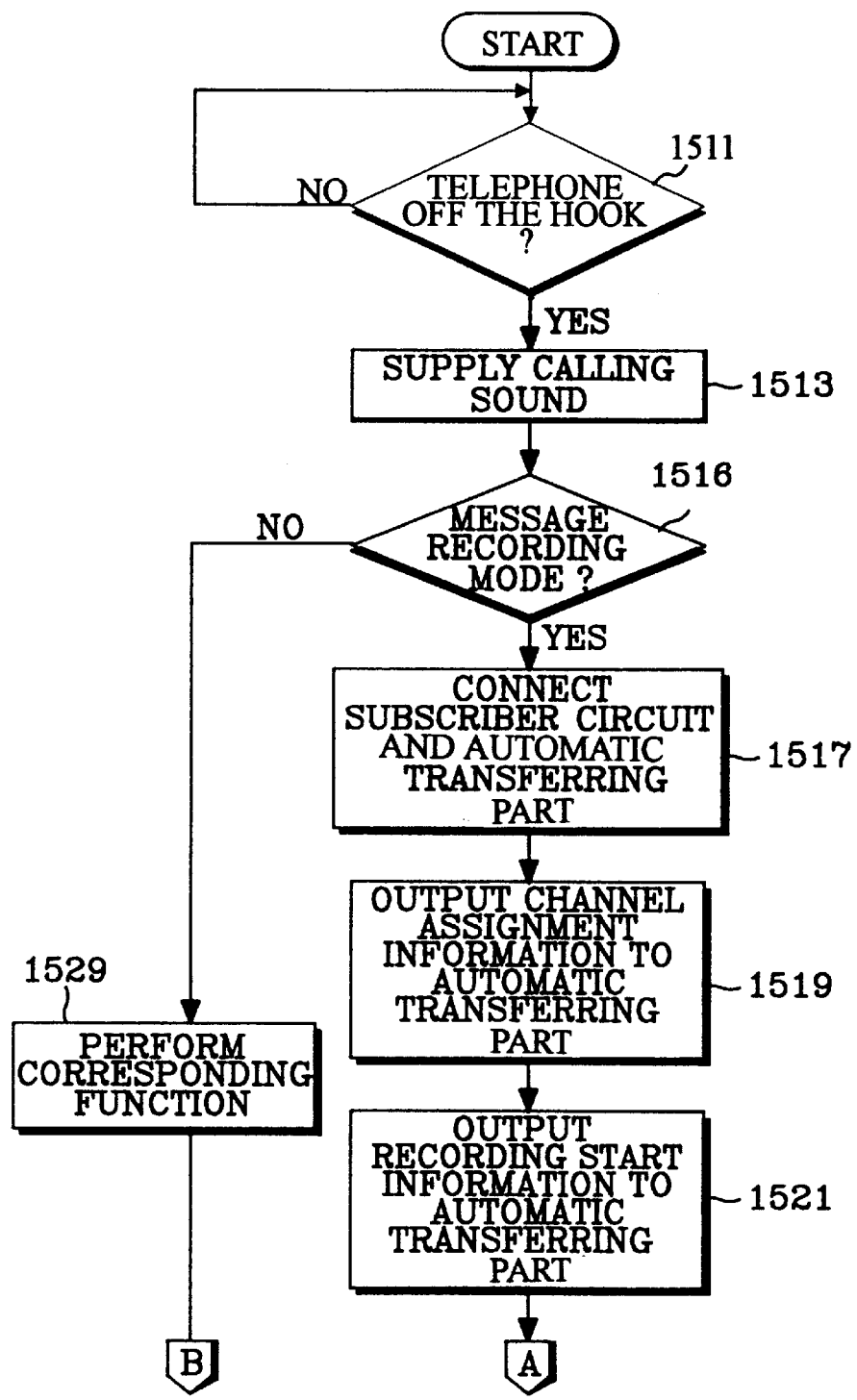
FIGS. 15A–15B together form a flowchart of the procedure in which, in the recording mode, the exchange controller transmits to the automatic transferring part vocal guide data information to be recorded.
Figure 15B:
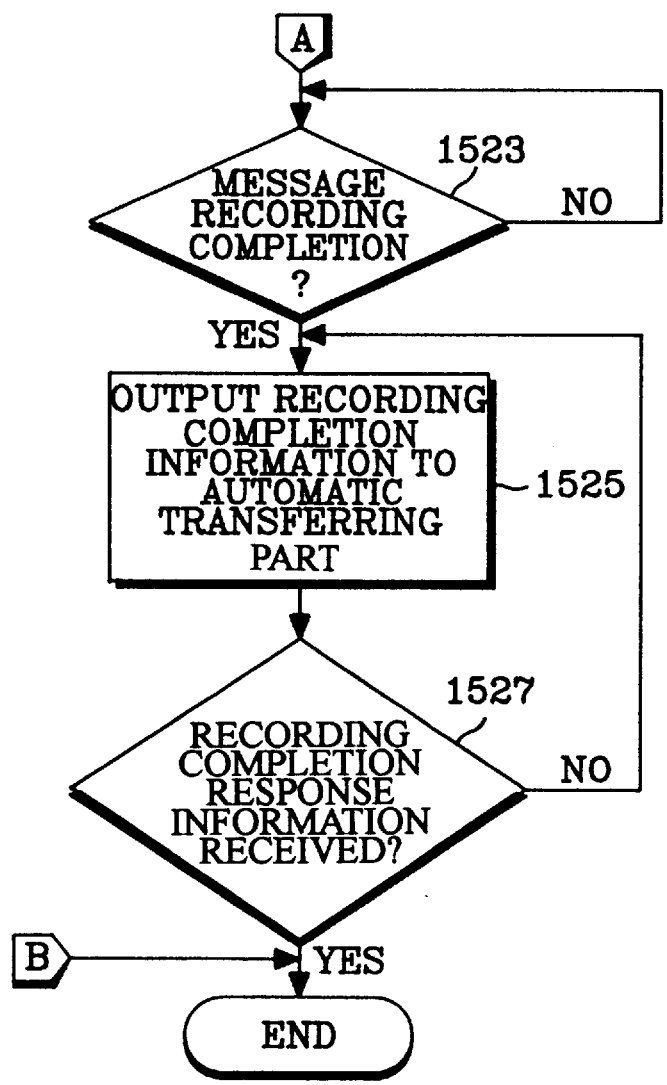

FIGS. 165A and 15B together form a flowchart for showing the operation of the exchange controller's transmitting information of the vocal guide message to be recorded to automatic transferring part 31 in the recording mode.

First of all, exchange controller 111 checks in step 1511 whether or not the subscriber's telephone is off the hook through subscriber circuit 114. Here, when the subscriber's telephone is off the hook, exchange controller 111 controls tone generator 116 and switching circuit 113 in step 1513 in order to supply a calling sound to a corresponding subscriber's telephone. In step 1516, exchange controller 111 checks whether or not the recording key data has been input through a DTMF receiver (not shown). Here, if other key data which is not the recording key data is input, the operation goes to step 1529 to perform a function for the input key data.

When the message recording key input is confirmed in step 1516, exchange controller 111 controls switching circuit 113 in step 1517 to form a communication path between a corresponding subscriber port of the subscriber circuit and automatic transferring part 118. In step 1519, exchange controller 111 transmits the channel designation IPC message and control signals like 1212 of FIG. 12A to the IPC unit 37 of the automatic transferring part 118 through the data bus. Here, the channel designation is performed at the reference of number 0 channel. After the channel designation IPC message is output, exchange controller 111 outputs the IPC message like 1222 of FIG. 12A to the IPC unit 37 of the automatic transferring part 118 in order to designate a recording number for a recording start in step 1521.

In this embodiment of the present invention, there is suggested a case which 64 vocal guide messages are stored. It is assumed that the vocal guide messages from number 0 to number 47 are variable and recorded in RAM 511 of memory 32, and messages from number 48 to number 63 are fixed and stored in ROM 512 of memory 32.

Automatic transferring part 118 receiving the IPC messages like 1212 of FIG. 12A and 1222 of FIG. 12A determines a reception port for recording the vocal guide message received by the IPC message of 1212 of FIG. 12A. Also, the transferring part designates a region for recording the received vocal guide message in RAM 511 of memory 32 according to the recording number of the IPC message like 1222 of FIG. 12A. Automatic transferring part 118 performs the operation of recording the received vocal guide message to the designation area of RAM 511 of memory 32.

While the recording mode has been performed as above, when the recording completion key data is received from the subscriber's telephone, the exchange controller 111 detects it in step 1523, and transmits the IPC message like 1226 of FIG. 12A to the IPC unit 37 of the automatic transferring part 118 in step 1525. When the response of the recording completion IPC message like 1228 of FIG. 12A is received, controller 111 detects it in step 1527, completes the recording mode, and prepares for the next state.

Figure 16A:
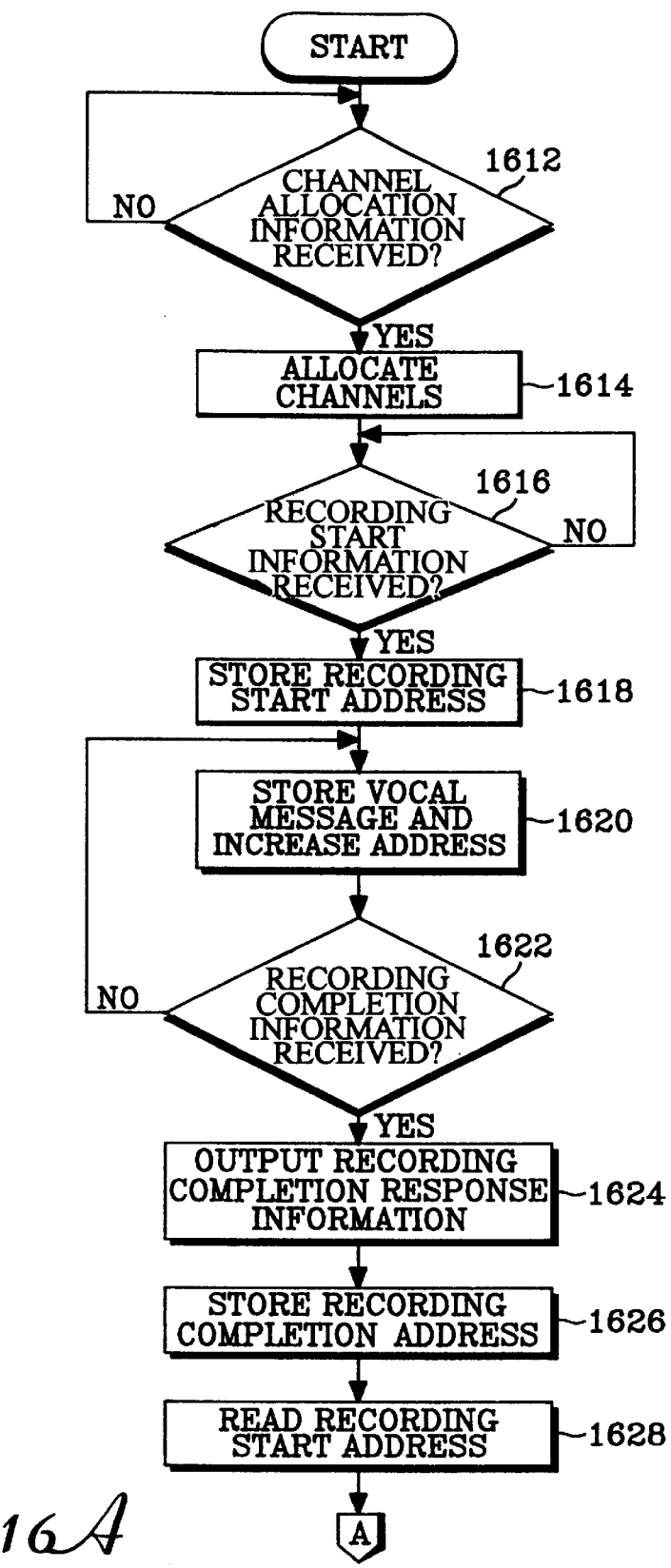
FIGS. 16A–16B together form a flowchart of the procedure in which, in the recording mode, the automatic transferring part records vocal guide data received under the control of the exchange controller.
Figure 16B:
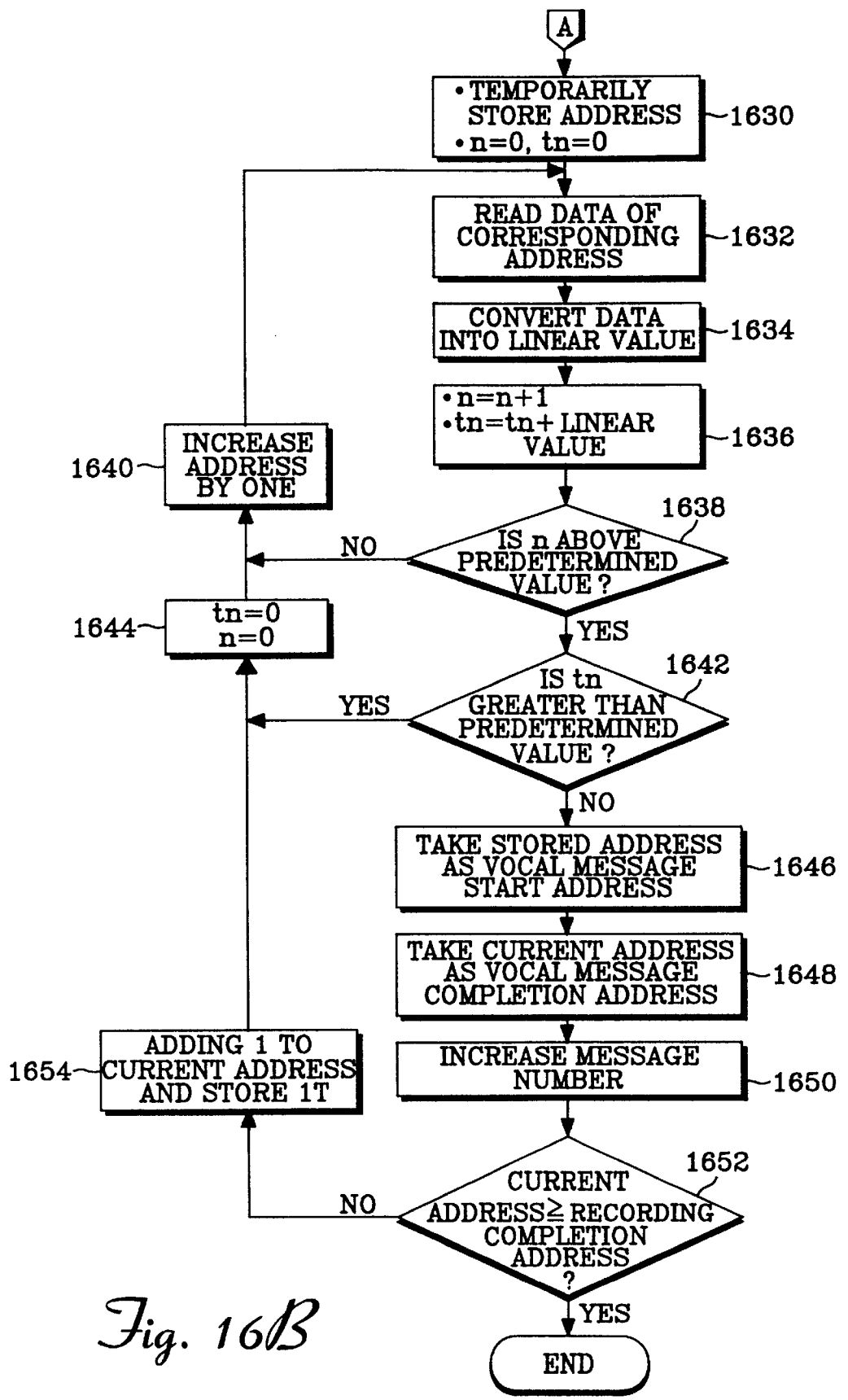

FIGS. 15A–15B shows the operation performed by exchange controller 111 in the recording mode. While exchange controller 111 runs as above, the automatic transfer controller 31 of the automatic transferring part 118 performs the operation shown in FIGS. 16A–16B to carry out the recording of the vocal guide message.

Above all, automatic transfer controller 31 checks the IPC unit 37 for a predetermined period to detect whether or not the IPC messages have been received. If the data read by the IPC 37 unit is the channel designation IPC message like 1212 of FIG. 12A, controller 111 controls time-division assignment part 38 to allocate the channel of port to be recorded in step 1612. After channel assignment, the automatic transfer controller 31 checks the IPC 37 unit in step 1616, to thereby determine whether or not the message like 1222 of FIG. 12A, indicative of the start of recording mode, has been received. Here the two highest bits of the IPC message of FIG. 12A are data informing the performance of the recording mode. The six lowest bits are recording number of the vocal guide messages to be recorded.

Accordingly, when the IPC message informing the recording start is received, the automatic transfer controller 31 stores the recording start address of memory 32 corresponding to the recording number in step 1618, and transfers the same IPC message as the received IPC message to the IPC unit 37 so as to respond that the recording mode starts.

Through steps 1620 and 1622, the variable vocal guide message received from serial/parallel converter 33 is recorded in RAM 511 as the address of RAM 511 increases. The vocal guide message to be recorded may be one or several sequential messages. Several sequential vocal guide messages are recorded with silent portions between the respective messages. This recording mode of automatic transferring part 118 is repeatedly performed until the recording completion IPC message like 1226 of FIG. 12A is received in exchange controller 111.

While the variable vocal guide message received through the highway is parallel-converted and stored in the recording number area of RAM 511, when the recording completion IPC message like 1226 of FIG. 12A is received, the automatic transfer controller 31 detects it in step 1622, outputs the recording completion response IPC message like 1228 of FIG. 12A to the IPC unit 37 in step 1624, and stores the final address for the final vocal guide message of the current recording number as the recording completion address in step 1626.

After this process, a determination is made as to whether the accumulation size of the vocal guide data for the current recording number is within a predetermined reference size. If the recorded vocal guide data is several sequential vocal messages, then the silent portions between the messages become smaller than the predetermined reference value. If a vocal guide message which is less than the reference value is received, then a vocal guide message for a corresponding recording number is stored and initialized. After the recording completion, automatic transfer controller 31 reads the recording start address for the vocal guide message of the current recording number in step 1628. In step 1630, this recording address is temporarily stored, and first and second variables n and tn are initialized. Here, first variable n is an address count value, and second variable tn is a linear accumulation value of data.

After the automatic transfer controller 31 reads the vocal guide message stored in a position of RAM 511 designated by the current address in steps 1632 and 1634, the read vocal guide message is converted into a linear value. Automatic transfer controller 31 increases by one the value of first variable n accumulating the number of access of the vocal guide message in step 1636, and accumulates the linear value of the current vocal guide message in the second variable tn for accumulating the linear value of the vocal guide message. In step 163, a determination is made as to whether or not the first variable n is above a predetermined value. If the first variable n is below the predetermined value, then the operation goes to step 1640 to increase the address by one and to again perform step 1632. Through the repetition of such a process, automatic transfer controller 31 accumulates the linear conversion value of the vocal guide message in second variable tn until the first variable n reaches a predetermined value.

In the above procedure, when the first variable becomes the predetermined value, automatic transfer controller 31 determines whether or not the accumulation value of the second variable tn is greater than a predetermined value in step 1642. Here, if the linear conversion value of the vocal guide message accumulated in second variable tn is smaller than the predetermined value, this indicates that the silent portion is made in the recorded vocal guide message and that one vocal message is completed. Then, the step goes to step 1646 so that the address stored in step 1630 is recorded as the start address of the current vocal message. In step 1648, the currently designated address is recorded as the completion address of the current vocal message.

Automatic transfer controller 31 increases the message number by one in preparation for the next recorded vocal message in step 1650. In step 1652, automatic transfer controller 31 checks whether the current address is equal to or greater than the recording completion address. If so, the recording mode is finished and a next state is prepared.

However, if the accumulation value of the second variable tn is greater than a predetermined value in step 1642, this indicates that one vocal message is continued so that automatic transfer controller 31 initializes first and second variables n and tn in step 1644, increases the address by one in step 1640. Steps 1632–1640 are then repeated.

If the current address is smaller than the recording completion address in step 1652, an address in which the current address is increased by one is temporarily stored in step 1654. This address becomes the start address of the vocal message corresponding to the message number increased in step 1650. The operation returns to step 1644 to initialize first and second variables n and tn and again perform steps 1632–1650.

As shown in FIGS. 15A–15B. 15 and 16, exchange controller 111 and automatic transfer controller 31 exchange their IPC messages, and one or several sequential variable vocal guide messages are recorded in RAM 511. Here, the start and completion of recording is performed while exchange controller 111 controls automatic transferring part 118 according to the subscriber's demand. Automatic transfer controller 31 of automatic transferring part 118 analyzes the IPC message output to exchange controller 111, and stores the variable vocal guide message received from the highway in RAM 511 of memory 32. Here, automatic transfer controller 31 stores the variable vocal guide message, and in case of several sequential variable vocal messages, the respective messages can be recorded individually.

Through this recording mode, the variable vocal guide messages received while corresponding to the designated recording number are stored in RAM 511 of memory 32, and the start address and completion address of RAM 511 corresponding to the respective recording numbers are stored. In the fixed vocal guide messages recorded in ROM 512 of memory 32, their start address and completion address are stored corresponding to the respective recording number.

In a state in which the recording mode is finished, when office line and extension incoming signals are generated, exchange controller 111 detects the incoming signal of office line circuit 117 and subscriber circuit 114. Exchange controller 111 outputs the IPC messages to automatic transferring part 118 in order to output a vocal guide message corresponding to the incoming signal. The automatic transfer controller 31 of automatic transferring part 118 analyzes the IPC message received, and reproduces a port corresponding to a vocal guide message.

Figure 17A:
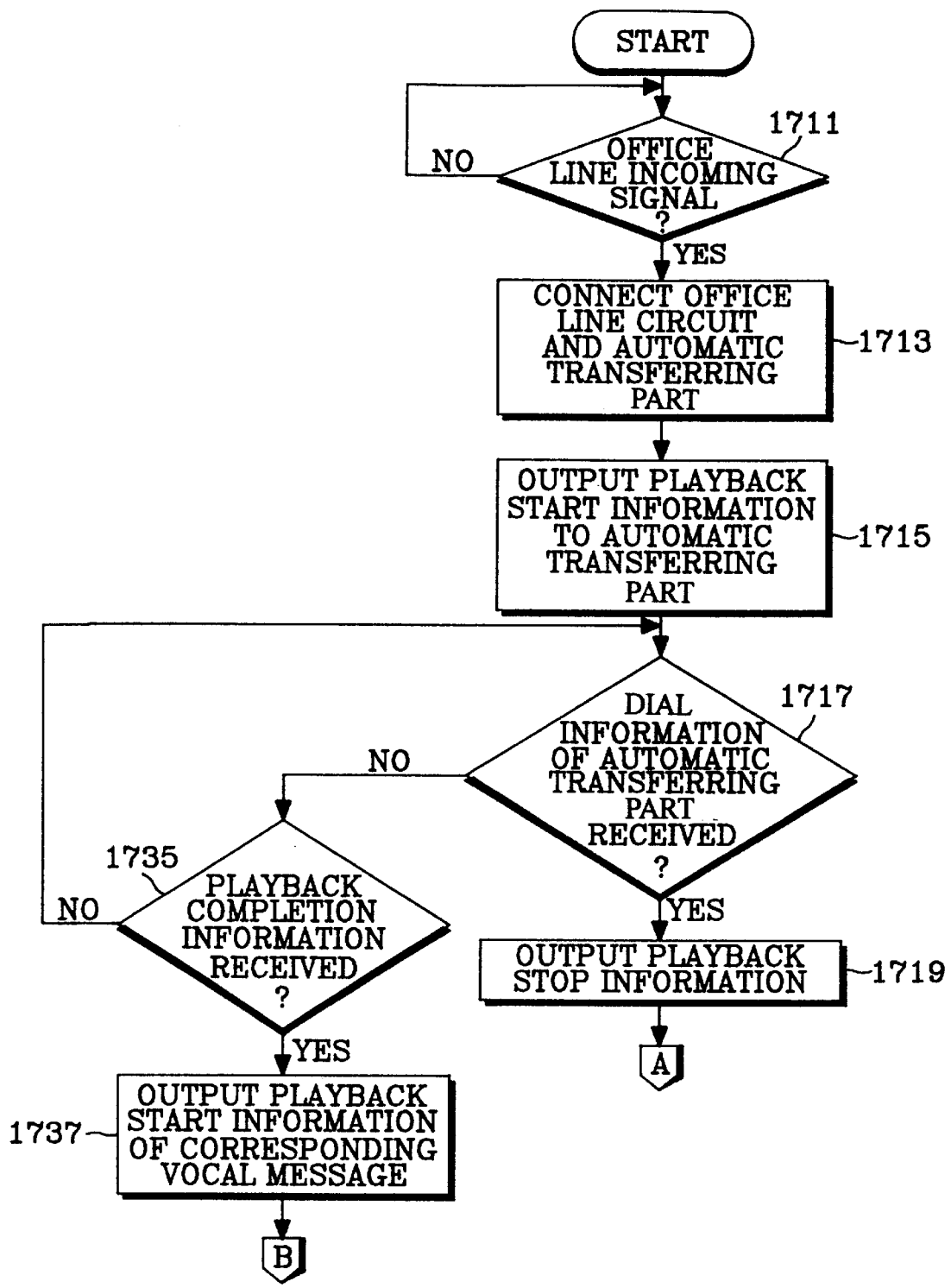
FIGS. 17A and 17B together form a flowchart of the procedure in which, in the playback mode, the exchange controller transmits to the automatic transferring part vocal guide data information to be reproduced.
Figure 17B:
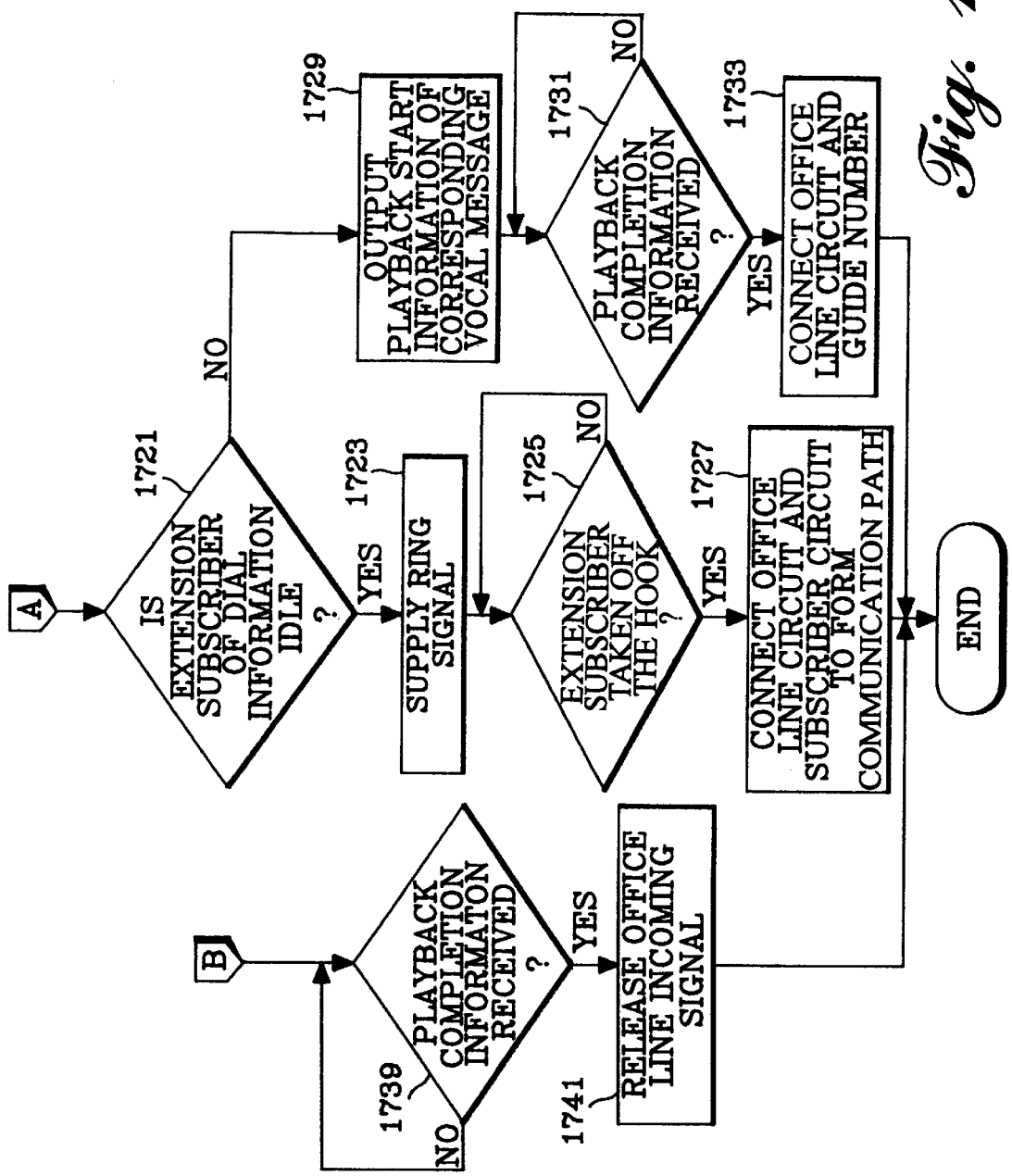

Referring to FIGS. 17A–17B, the following is a procedure performed when the office line incoming signal is generated.

First of all, when the incoming signal is generated from the office line, exchange controller 111 detects it in step 1711 through office line 117. In step 1713, switching circuit 113 is controlled to form a communication path between a corresponding office line port of office line circuit 117 and automatic transferring part 118. Exchange controller 111 outputs the IPC message in order to perform a mode for reproducing the recorded vocal guide message in step 1715. Here, exchange controller 111 outputs an IPC message for selecting one of the parallel/serial converters 34 transmitting vocal guide data reproduced like 1232 of FIG. 12B, and outputs the IPC message like 1634 of FIG. 12B for determining the recording number of the vocal guide message to be output to the selected parallel/serial converter 34.

After the IPC messages for performing the playback mode are output, automatic transfer controller 31 outputs vocal guide messages of the recording number designated in a port. In this state, exchange controller 111 performs steps 1717 and 1735 in order to determines whether or not the extension number incoming from automatic transferring part 118 or a playback completion IPC message indicative of the playback completion of the designated vocal guide message has been received. If the incoming extension number and the IPC message are not received in the automatic transferring part 118, then the exchange controller 111 is in a standby state in order to reproduce the currently output vocal guide message.

When the automatic transferring part 118 outputs the IPC message of the incoming extension number, the exchange controller 111 detects it in step 1717, and outputs the playback stop IPC message for interrupting the currently supplied vocal guide message to the IPC unit 37 of the automatic transferring part 118 in step 1719. The exchange controller 111 checks the state of the subscriber of the extension number received through subscriber circuit 114. If the subscriber at the selected extension number is idle, steps 1723–1727 are performed to connect the office line incoming signal to the extension subscriber. In other words, the exchange controller 111 connects the ring generator to the extension subscriber port of the subscriber circuit 114 to thereby supply a ring signal. If a corresponding extension subscriber is taken off the hook, then switching circuit 113 is controlled to form a communication path.

If the subscriber of the extension number received is found to not be idle (for instance, during another communication) in step 1721, then the exchange controller 111 performs steps 1729–1733 and transmits the IPC messages to resend the vocal guide data for informing a corresponding state to the office line caller because a corresponding extension subscriber cannot answer. Steps 1729–1733 are exemplified by a procedure of connecting the automatic transferring part 118 to the guide telephone number.

If an extension number generated by the office line caller is not received until the automatic transferring part 118 receives the playback completion IPC message, then the exchange controller 111 detects it in step 1735, and performs steps 1737–1741. Steps 1737–1741 show a process in which a call service is not performed any more and its communication path is blocked if the office line caller does not dial until after the playback of the vocal guide message has been completed.

Figure 18:
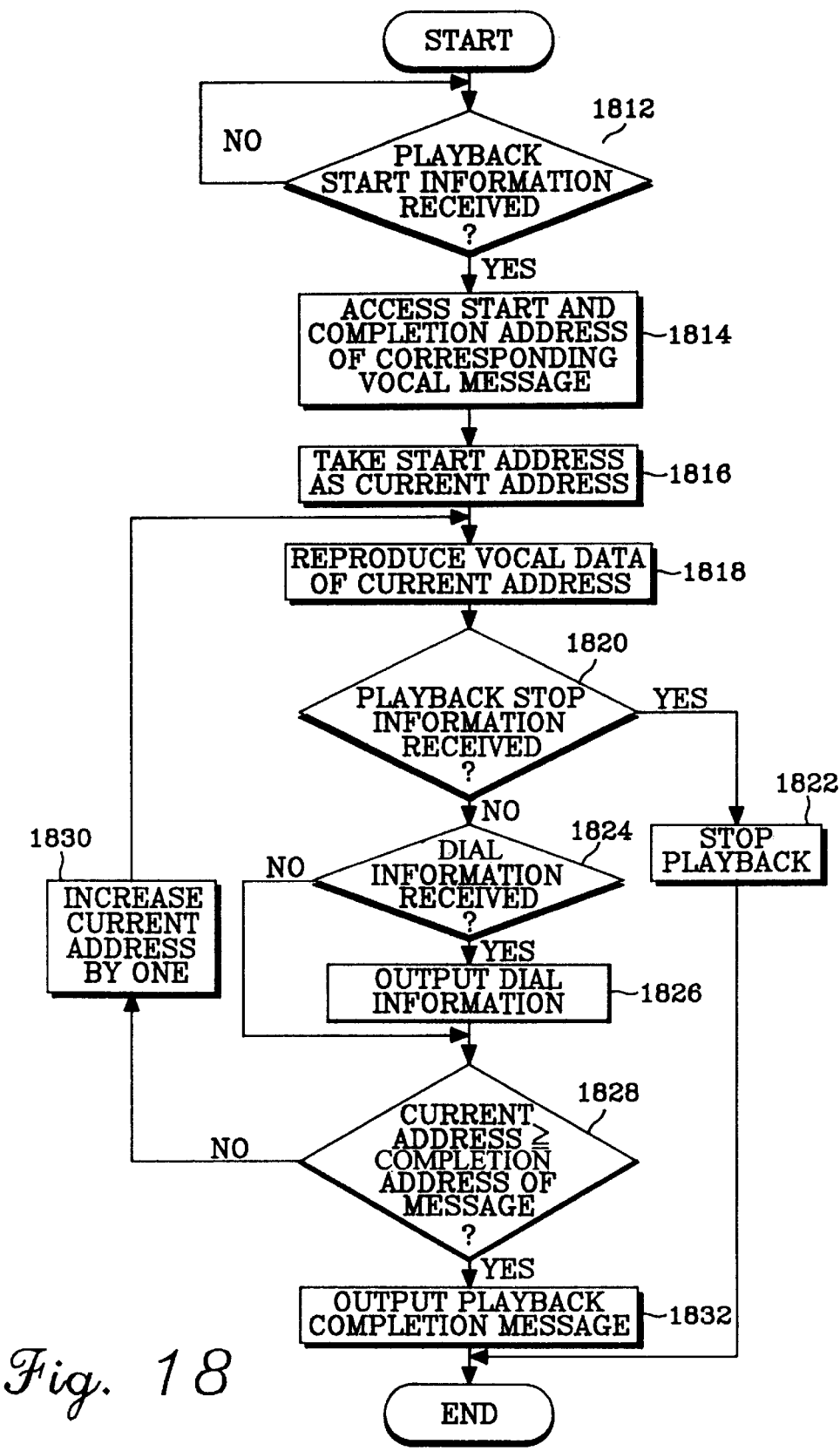
FIG. 18 is a flowchart of the procedure in which, in the playback mode, the automatic transferring part reproduces vocal guide data received under the control of the exchange controller.

When the exchange controller 111 effects the playback mode, the automatic transfer controller 311 of automatic transferring part 118 performs automatic transfer through the use of a vocal guide in accordance with the respective states as shown in FIG. 18.

When exchange controller 111 outputs the playback start IPC message, the automatic transfer controller 31 detects it in step 1812, confirms the start address and completion address of the vocal guide message corresponding to the recording number of the playback start IPC message in steps 1814 and 1816, and takes the start address as the current address. Automatic transfer controller 31 reproduces the vocal guide message corresponding to the current address in memory 32, and outputs it to the highway through parallel/serial converter 34 of a designated port. The vocal guide message output to the highway is applied to the office line subscriber through switching circuit 113 and office line circuit 117.

When the office line caller listens to the vocal guide message and dials a desired number of an extension subscriber, this is input to automatic transferring part 118 through office line circuit 117 and switching circuit 113. The DTMF receiver 36 converts the DTMF signal into digital data, and applies it to automatic transfer controller 31. The aromatic transfer controller 31 detects the reception of the dialing data in step 1824, converts the extension number into the IPC message in step 1826, and outputs it to the exchange controller 111.

In response to this, when the exchange controller 111 outputs a playback stop IPC message, the automatic transfer controller detects it in step 1820, disables the corresponding parallel/serial converter 34 and interrupts the playback of the vocal guide message corresponding to a recording number in step 1822.

If the dialing data or playback stop IPC message is not received until after playback of the vocal guide message of a recording number has been finished, then the automatic transfer controller 31 detects it in step 1828, outputs the playback completion IPC message to the exchange controller in step 1832, and finishes the playback mode.

As described above, in the playback mode, the exchange controller 111 outputs the playback start IPC message in order to reproduce the vocal guide message in accordance with the respective communication states, and the automatic transferring part 118 reproduces the vocal guide messages of the recording number designated in exchange controller 111 and outputs it to the office line caller. If the office line caller listens to the vocal guide message and dials a desired extension number, the automatic transferring part 118 converts it into digital data and outputs it to exchange controller 111. Then the exchange controller 111 stops the playback of the vocal guide message reproduced, and forms a communication path between the office line and the extension subscriber.

In short, the present invention is advantageous in performing automatic transfer service for multiple ports with only a single port memory by using the automatic transferring equipment in the exchange.

What is claimed is:

1. An automatic transferring apparatus for an exchange which automatically transfers an office line incoming call to an extension line, said apparatus comprising:

a serial to parallel converter, connected to a switching circuit, for converting received serial vocal data into parallel data;

a memory for directly storing without further conversion said parallel-converted vocal data as a vocal guide message;

a DTMF receiver, connected to said switching circuit, for converting a DTMF signal from the office line into digital data;

a parallel to serial converter for directly converting said parallel vocal data output from said memory into serial vocal data, and for outputting it to said switching circuit;

a time-division allocator for allocating time slot assignments of said serial to parallel converter and said parallel to serial converter;

an interprocessor communication unit IPC, connected to an exchange controller, for receiving a command for automatic transfer; and an automatic transfer controller for controlling said memory in a recording mode to thereby store said parallel-converted vocal data as a vocal guide message, said controller outputting said vocal guide message by controlling said memory in an automatic transfer mode, and said controller outputting a received DTMF signal from the office line to said exchange controller as an extension number, said exchange controller connecting the office line incoming call to an extension line corresponding to the extension number.

2. A method of communication of an exchange having an automatic transferring unit and in which an exchange controller forms a communication path to the automatic transferring unit to thereby automatically transfer an office line incoming call to an extension designated by a caller, said method comprising the steps of:

parallel-converting serial vocal data input in a serial to parallel converter when a recording mode command is received, and directly storing it without further conversion as a vocal guide message;

directly serial-converting the stored vocal guide message in a parallel to serial converter when an automatic transfer mode command is received;

allocating time slot assignments of said serial to parallel converter and said parallel to serial converter;

detecting a DTMF signal received from the office line, after the output of the vocal guide message, as an extension designation signal for designating an extension number; and outputting the extension number to the exchange controller, and finishing automatic transfer;

wherein the exchange controller controls a switching circuit to automatically connect the incoming office line to the extension designated by the caller.

3. An apparatus as recited in claim 1, wherein said exchange controller comprises:

a means for determining if a telephone on an extension line is off the hook;

a tone generator connected to said switching circuit for supplying a calling sound to said telephone when said detecting means has detected that said telephone is off the hook;

a second means for determining whether or not a message recording mode command has been issued by said telephone;

a third means for controlling said switching circuit to form a communication path between said telephone and the automatic transfer controller and transmitting a channel designation IPC message and control signals to said interprocessor communication unit IPC through a data bus and further outputting an IPC message to said interprocessor communication unit IPC for designating a recording start information number, provided that said telephone has output said recording mode command;

a fourth means for detecting a message recording completion command from said telephone and for transmitting an IPC message to said interprocessor communication unit IPC when said completion command is detected, and a fifth means for detecting the recording completion IPC message and for removing the apparatus from the recording mode in response thereto.

* * * * *